United States Patent
Xu et al.

(10) Patent No.: US 11,254,577 B2
(45) Date of Patent: Feb. 22, 2022

(54) METHODS OF TREATING GRAPHITIC MATERIALS AND OF PREPARING COLLOIDAL SOLUTIONS INCLUDING GRAPHITIC MATERIALS

(71) Applicant: King Abdullah University of Science and Technology, Thuwal (SA)

(72) Inventors: Xuezhu Xu, Thuwal (SA); Jian Zhou, Thuwal (SA); Gilles Lubineau, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 379 days.

(21) Appl. No.: 16/475,179

(22) PCT Filed: Dec. 29, 2017

(86) PCT No.: PCT/IB2017/058521
§ 371 (c)(1),
(2) Date: Jul. 1, 2019

(87) PCT Pub. No.: WO2018/122796
PCT Pub. Date: Jul. 5, 2018

(65) Prior Publication Data
US 2019/0337807 A1    Nov. 7, 2019

Related U.S. Application Data

(60) Provisional application No. 62/440,015, filed on Dec. 29, 2016.

(51) Int. Cl.
*C01B 32/196* (2017.01)
*C01B 32/17* (2017.01)
(Continued)

(52) U.S. Cl.
CPC .......... *C01B 32/196* (2017.08); *C01B 32/154* (2017.08); *C01B 32/17* (2017.08);
(Continued)

(58) Field of Classification Search
CPC ..... C01B 32/196; C01B 32/17; C01B 32/215; C01B 32/174; C01B 32/154; C01B 2204/32; C01D 3/04; C01D 3/10
See application file for complete search history.

(56) References Cited

FOREIGN PATENT DOCUMENTS

| AT | 386818 B | 10/1988 |
|---|---|---|
| CN | 103173882 A | * 6/2013 |

(Continued)

OTHER PUBLICATIONS

Baez, Jorge, et al. "Stabilization of interfacially-active-nanohybrids/polymer suspensions and transport through porous media." SPE Improved Oil Recovery Symposium. Society of Petroleum Engineers, 2012.*
(Continued)

*Primary Examiner* — Richard M Rump
(74) *Attorney, Agent, or Firm* — Billion & Armitage

(57) ABSTRACT

Embodiments of the present disclosure describe a method of preparing a colloidal solution comprising preparing a salted aqueous solvent and dispersing a graphitic material in the salted aqueous solvent. Embodiments of the present disclosure further describe a method of treating a graphitic material comprising agitating a graphitic material in a salted aqueous solvent and removing residual chemical species to obtain a treated graphitic material. Embodiments of the present disclosure also describe a colloidal solution comprising a liquid medium and a treated graphitic material dispersed in the liquid medium sufficient to form a colloidal solution.

15 Claims, 28 Drawing Sheets

(51) Int. Cl.

| | | |
|---|---|---|
| C01B 32/215 | (2017.01) | |
| C01B 32/174 | (2017.01) | |
| C01B 32/154 | (2017.01) | |
| C01D 3/04 | (2006.01) | |
| C01D 3/10 | (2006.01) | |

(52) U.S. Cl.
CPC .......... *C01B 32/174* (2017.08); *C01B 32/215* (2017.08); *C01D 3/04* (2013.01); *C01D 3/10* (2013.01); *C01B 2204/32* (2013.01)

(56) References Cited

FOREIGN PATENT DOCUMENTS

| EP | 2631260 A1 | 8/2013 |
|---|---|---|
| KR | 20040106096 A | * 12/2004 |

OTHER PUBLICATIONS

Machine Engllish translation of CN103173882A (2013).*
Xu, Zhen, and Chao Gao. "Aqueous liquid crystals of graphene oxide." ACS nano 5.4 (2011): 2908-2915.*
Nayar, K. G., D. Panchanathan, G. H. McKinley, and J. H. Lienhard. "Surface Tension of Seawater." Journal of Physical and Chemical Reference Data 43, No. 4 (Dec. 2014): 043103.*
Wang S, Zhang Y, Abidi N, Cabrales L. Wettability and surface free energy of graphene films. Langmuir. Sep. 15, 2009;25(18): 11078-81. doi: 10.1021/la901402f. PMID: 19735153.*
Yoon, Ki Youl, et al. "Graphene oxide nanoplatelet dispersions in concentrated NaCl and stabilization of oil/water emulsions." Journal of colloid and interface science 403 (2013): 1-6.*
Chen, Changlong, et al. "Surfactant-only stabilized dispersions of multiwalled carbon nanotubes in high-electrolyte-concentration brines." Energy & Fuels 30.11 (2016): 8952-8961.*
Li, Dan, et al. "Processable aqueous dispersions of graphene nanosheets." Nature nanotechnology 3.2 (2008): 101-105.*
Ankamwar, Balaprasad, and Farah Surti. "Water soluble graphene synthesis." Chem Sci Trans 1.3 (2012): 500-507.*
English machine translation of KR20040106096A.*
Ma, Xin, Bethany Wigington, and Dermont Bouchard. "Fullerene C60: surface energy and interfacial interactions in aqueous systems." Langmuir 26.14 (2010): 11886-11893.*
Notification of Transmittal of the International Search Report and the Written Opinion of the International Searching Authority, or the Declaration for PCT/IB2017/058521 dated Mar. 16, 2018.
Xu, et al., "Preparation of water soluable graphene nanoplatelets and highly conductive films", Carbon, 124, 2017, 133-144.
Xu, et al., "Sodium hypochlorite and sodium bromide individualized and stabilized carbon nanotubes in water", Langmuir, 33, 2017, 10868-10876.
Allen, et al., "Honeycomb Carbon: A Review of Graphene", Chemical Reviews, vol. 110, No. 1, 2010, pp. 132-145.
Banhart, et al., "Structural Defects in Graphene", ACS Nano, vol. 5, No. 1, 2011, pp. 26-41.
Beattie, et al., "pH and the Surface Tension of Water", Journal of Colloid and Interface Science, vol. 422, 2014, pp. 54-57.
Behabtu, et al., "Spontaneous High-Concentration Dispersions and Liquid Crystals of Graphene", Nature Nanotechnology, vol. 5, Jun. 2010, pp. 406-411.
Brodie, "On the Atomic Weight of Graphite", Philosophical Transactions of the Royal Society of London, vol. 149, 1859, pp. 249-259.
Coleman, et al., "Small but Strong: A Review of the Mechanical Properties of Carbon Nanotube-Polymer Composites", Carbon, vol. 44, 2006, pp. 1624-1652.
Cong, et al., "Macroscopic Multifunctional Graphene-Based Hydrogels and Aerogels by a Metal Ion Induced Self-Assembly Process", ACS Nano, vol. 6, No. 3, 2012, pp. 2693-2703.
Cunningham, et al., "Solvent Exfoliation of Transition Metal Dichalcogenides: Dispersibility of Exfoliated Nanosheets Varies Only Weakly between Compounds", ACS Nano, vol. 6, No. 4, 2012, pp. 3468-3480.
Dimiev, et al., "Stable Aqueous Colloidal Solutions of Intact Surfactant-Free Graphene Nanoribbons and Related Graphitic Nanostructures", Chemical Communication, vol. 49, Feb. 13, 2013, pp. 2613-2615.
Dong, et al., "3D Graphene—Cobalt Oxide Electrode for High-Performance Supercapacitor and Enzymeless Glucose Detection", ACS Nano, vol. 6, No. 4, Mar. 21, 2012, pp. 3206-3213.
Dreyer, et al., "The Chemistry of Graphene Oxide", Chemical Society Reviews, vol. 39, 2010, pp. 228-240.
El-Kady, et al., "Laser Scribing of High-Performance and Flexible Graphene-Based Electrochemical Capacitors", Science, vol. 335, Mar. 16, 2012, pp. 1326-1330.
Englert, et al., "Soluble Graphene: Generation of Aqueous Graphene Solutions Aided by a Perylenebisimide-Based Bolaamphiphile", Advanced Materials, vol. 21, 2009, pp. 4265-4269.
Ferrari, et al., "Interpretation of Raman Spectra of Disordered and Amorphous Carbon", Physical Review B, vol. 61, No. 20, May 15, 2000, pp. 14095-14107.
Ferrari, et al., "Raman Spectroscopy as a Versatile Tool for Studying the Properties of Graphene", Nature Nanotechnology, vol. 8, Apr. 4, 2013, pp. 235-246.
Ferrari, et al., "Raman Spectrum of Graphene and Graphene Layers", Physical Review Letters, vol. 97, Nov. 3, 2006, pp. 187401-1-187401-4.
Gao, et al., "Epitaxial Graphene on Cu(111)", Nano Letters, vol. 10, Aug. 2, 2010, pp. 3512-3516.
Geim, "Graphene: Status and Prospects", Science, vol. 324, Jun. 19, 2009, pp. 1530-1534.
Geng, et al., "Preparation of Graphene Relying on Porphyrin Exfoliation of Graphite", Chemical Communication, vol. 46, 2010, pp. 5091-5093.
Hao, et al., "Aqueous Dispersions of TCNQ-Anion-Stabilized Graphene Sheets", Chemical Communication, Nov. 12, 2008, pp. 6576-6578.
Harrelson, et al., "A Review of the Cooling Water Methods for Sodium Hypochlorite Activation of Sodium Bromide into a Hypobromous Acid—Hypobromite Biocide", 72nd Annual International Water Conference, IWC 11-47, 2011, 10 pages.
Hernandez, et al., "High-Yield Production of Graphene by Liquid-Phase Exfoliation of Graphite", Nature Nanotechnology, vol. 3, Sep. 2008, pp. 563-568.
Hummers Jr., et al., "Preparation of Graphitic Oxide", Journal of the American Chemical Society, vol. 80, Mar. 20, 1958, p. 1339.
Hussain, et al., "Spectroscopic Investigation of Modified Single Wall Carbon Nanotube (SWCNT)", Journal of Modern Physics, vol. 2, Jun. 2011, pp. 538-543.
Johra, et al., "Facile and Safe Graphene Preparation on Solution Based Platform", Journal of Industrial and Engineering Chemistry, vol. 20, 2014, pp. 2883-2887.
Jungwirth, "Ions at Aqueous Interface", Faraday Discussions, vol. 141, 2009, pp. 1-47.
Kim, et al., "Activated Graphene-Based Carbons as Supercapacitor Electrodes with Macro-and Mesopores", ACS Nano, vol. 7, No. 8, Jul. 7, 2013, pp. 6899-6905.
Kocherbitov, "Calculation of Debye Length", Retrieved from "www.surfchem.info/calculate/Debye/", 2015, 1 page.
Kudin, et al., "Raman Spectra of Graphite Oxide and Functionalized Graphene Sheets", Nano Letters, vol. 8, No. 1, 2008, pp. 36-41.
Lee, et al., "Measurement of the Elastic Properties and Intrinsic Strength of Monolayer Graphene", Science, vol. 321, Jul. 18, 2008, pp. 385-388.
Li, et al., "Processable Aqueous Dispersions of Graphene Nanosheets", Nature Nanotechnology, vol. 3, No. 2, 2008, pp. 101-105.
Liang, et al., "Molecular-Level Dispersion of Graphene into Poly(vinyl alcohol) and Effective Reinforcement of their Nanocomposites", Advanced Functional Materials, vol. 19, 2009, pp. 1-6.
Liu, et al., "Processing of Graphene for Electrochemical Application: Noncovalently Functionalize Graphene Sheets with Water-Soluble Electroactive Methylene Green", Langmuir, vol. 25, No. 20, 2009, pp. 12006-12010.
Liu, et al., "Stable Aqueous Dispersion of Graphene Nanosheets: Noncovalent Functionalization by a Polymeric Reducing Agent and

(56) References Cited

OTHER PUBLICATIONS

Their Subsequent Decoration with Ag Nanoparticles for Enzymeless Hydrogen Peroxide Detection", Macromolecules, vol. 43, Nov. 17, 2010, pp. 10078-10083.
Lotya, et al., "Liquid Phase Production of Graphene by Exfoliation of Graphite in Surfactant/Water Solutions", Journal of the American Chemical Society, vol. 131, Feb. 19, 2009, pp. 3611-3620.
Luong, et al., "Graphene/Cellulose Nanocomposite Paper with High Electrical and Mechanical Performances", Journal of Materials Chemistry, vol. 21, Aug. 8, 2011, pp. 13991-13998.
Marcano, et al., "Improved Synthesis of Graphene Oxide", ACS Nano, vol. 4, No. 8, Jul. 22, 2010, pp. 4806-4814.
Milner, et al., "Structure and Morphology of Charged Graphene Platelets in Solution by Small-Angle Neutron Scattering", American Chemical Society, vol. 134, 2012, 4 pages.
Nair, et al., "Fine Structure Constant Defines Visual Transparency of Graphene", Science, vol. 320, Jun. 6, 2008, p. 1308.
Park, et al., "Chemical Methods for the Production of Graphenes", Nature Nanotechnology, vol. 4, Mar. 29, 2009, pp. 1-8.
Paton, et al., "Scalable Production of Large Quantities of Defect-Free Few-Layer Graphene by Shear Exfoliation in Liquids", Nature Materials, vol. 13, Apr. 2014, pp. 624-630.
Pendolino, et al., "Temperature Influence on the Synthesis of Pristine Graphene Oxide and Graphite Oxide", Materials Chemistry and Physics, vol. 164, 2015, pp. 71-77.
Rafiee, et al., "Enhanced Mechanical Properties of Nanocomposites at Low Graphene Content", ACS Nano, vol. 3, No. 12, Dec. 3, 2009, pp. 3884-3890.
Si, et al., "Synthesis of Water Soluble Graphene", Nano Letters, vol. 8, No. 6, May 23, 2008, pp. 1679-1682.
Staudenmaier, "Process for the Preparation of Graphitic Acid", Reports of the German Chemical Society, vol. 31, 1898, 9 pages.
J. Teixeira, "Small-Angle Scattering by Fractal Systems", Journal of Applied Crystallography, vol. 21, 1988, pp. 781-785.
Wen, et al., "Expanded Graphite as Superior Anode for Sodium-Ion Batteries", Nature Communications, vol. 5, No. 4033, Jun. 4, 2014, pp. 1-10.
Xu, et al., "Fabrication of High Strength PVA/SWCNT Composite Fibers by Gel Spinning", Carbon, vol. 48, 2010, pp. 1977-1984.
Xu, et al., "Flexible Graphene Films via the Filtration of Water-Soluble Noncovalent Functionalized Graphene Sheets", Journal of American Chemical Society, vol. 130, No. 18, Apr. 10, 2008, pp. 5856-5857.
Zhang, et al., "Dispersion of Graphene in Ethanol Using a Simple Solvent Exchange Method", Chemical Communications, vol. 46, Oct. 5, 2010, pp. 7539-7541.
Zhou, et al., "Improving Electrical Conductivity in Polycarbonate Nanocomposites Using Highly Conductive PEDOT/PSS Coated MWCNTs", ACS Applied Materials Interfaces, vol. 5, 2013, 12 pages.
Zhou, et al., "Probing the Role of Poly(3,4-ethylenedioxythiophene)/Poly(styrenesulfonate)—Coated Multiwalled Carbon Nanotubes in the Thermal and Mechanical Properties of Polycarbonate Nanocomposites", Industrial & Engineering Chemistry Research, vol. 53, Feb. 14, 2014, pp. 3539-3549.
Zhu, et al., "Graphene and Graphene Oxide: Synthesis, Properties, and Applications", Advanced Materials, vol. 22, Jun. 29, 2010, pp. 3906-3924.
Cheng, et al., "Anion Fractionation and Reactivity at Air/Water:Methanol Interfaces. Implications for the Origin of Hofmeister Effects", The Journal of Physical Chemistry B, vol. 112, No. 24, May 29, 2008, pp. 7157-7161.

* cited by examiner

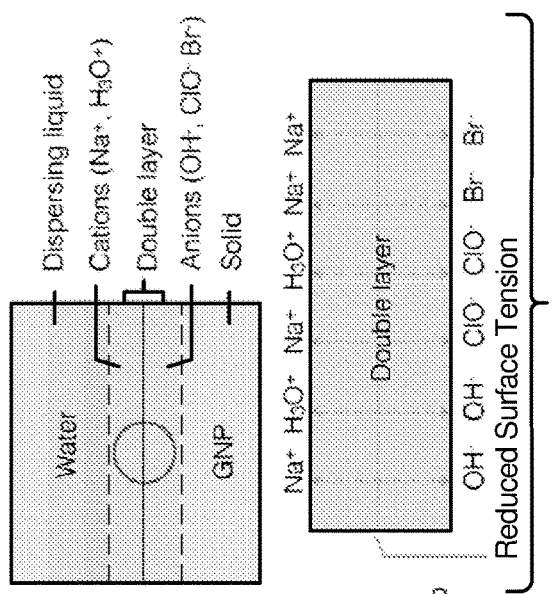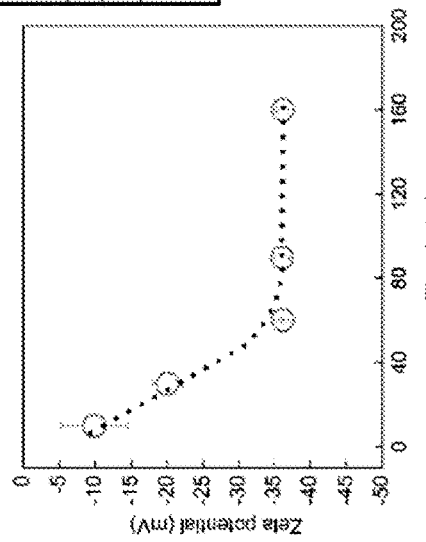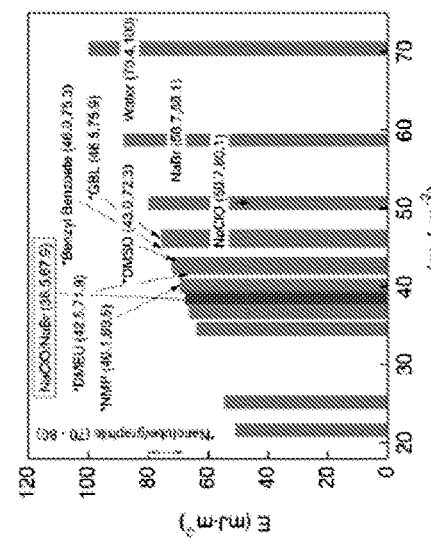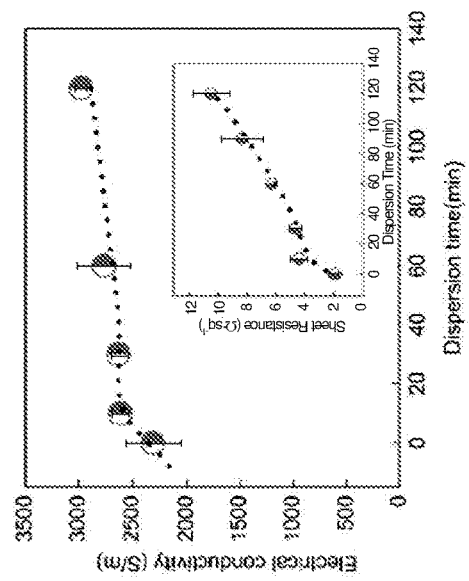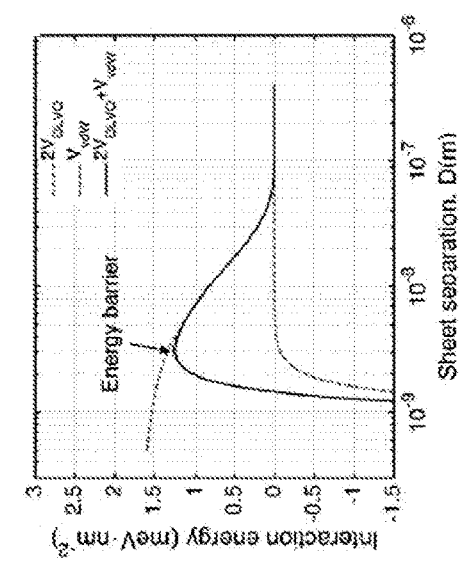
FIG. 16A  FIG. 16B  FIG. 16C  FIG. 16D  FIG. 16E  FIG. 16F

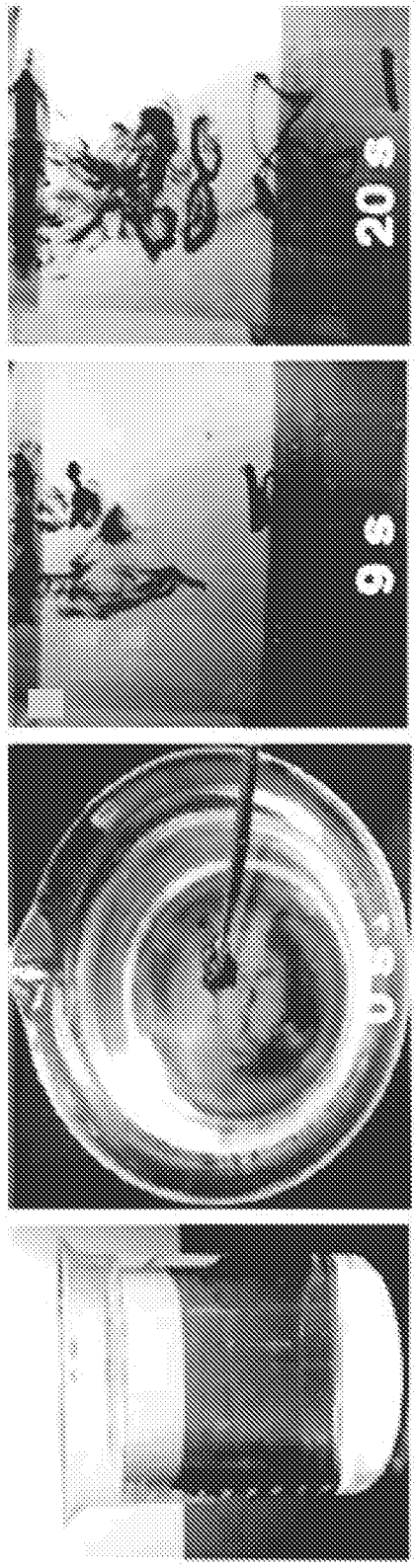
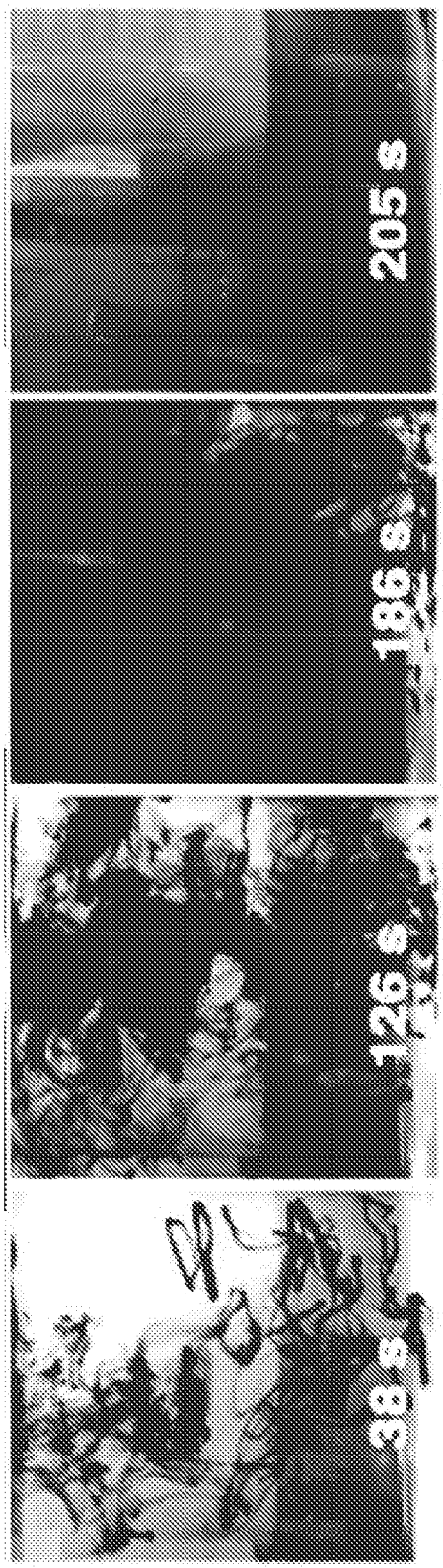
FIG. 19A  FIG. 19B  FIG. 19C  FIG. 19D
FIG. 19E  FIG. 19F  FIG. 19G  FIG. 19H

METHODS OF TREATING GRAPHITIC MATERIALS AND OF PREPARING COLLOIDAL SOLUTIONS INCLUDING GRAPHITIC MATERIALS

BACKGROUND

The properties of dispersions depend upon the nature of the material being dispersed and the dispersing media interface. In general, aqueous dispersions of graphitic materials may not be realized due to the hydrophobicity of the graphitic materials and presence of strong van der Waals forces. More specifically, graphitic materials (e.g., graphitic carbon nanostructures), without chemical modification, are highly hydrophobic. This hydrophobicity prevents them from forming stable dispersions in aqueous media. In addition, graphene exhibits poor solubility in organic solvents due to strong attractive van der Waals forces between graphene sheets. Consequently, van der Waals forces cause graphitic materials to re-aggregate, which makes it difficult to form complete dispersions of graphitic materials in aqueous solutions.

Several methods have been developed to address these issues and disperse few-layer graphene powder in aqueous media. One method, for example, includes chemical modification via introduction of water-solubilizing functional groups. For example, chemical modification includes oxidation or covalent functionalization by introducing $sp^3$-hybridized sites into the graphitic structure. This method, however, is undesirable because it alters the electronic properties of the $sp^2$ structure of the graphitic material. Another method includes surfactant wrapping of graphene sheets to create hydrophilic surfaces. While surfactants may facilitate dispersion of graphene nanoplatelets in water without destroying the graphitic structure, an excessively thick layer of surfactant accumulates on the surface of the structure. Consequently, use of surfactants are not preferred where the purity of the graphitic material is critical. In addition, methods that use highly acidic/organic solvents have a number of severe limitations. For example, they can have explosive characteristics, be difficult to remove, or introduce components with low conductivity (e.g., PSS in the PEDOT/PSS) into the product. In addition, many of the methods described above have low scalability, resulting in products with a low concentration of graphene (e.g., when NMP is used as the solvent).

SUMMARY

In general, embodiments of the present disclosure describe methods of treating graphitic materials, as well as colloidal solutions including graphitic materials and methods of preparing colloidal solutions that include graphitic materials.

Accordingly, embodiments of the present disclosure describe a method of preparing a colloidal solution comprising preparing a salted aqueous solvent and dispersing a graphitic material in the salted aqueous solvent.

Embodiments of the present disclosure further describe a method of treating a graphitic material comprising agitating a graphitic material in a salted aqueous solvent and removing residual chemical species to obtain a treated graphitic material.

Another embodiment of the present disclosure is a colloidal solution comprising a liquid medium and a treated graphitic material dispersed in the liquid medium sufficient to form a colloidal solution.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 16a-16f are graphical views of (a) surface energy versus surface tension of the solvent with values marked with an asterisk obtained from literature; (b) Zeta-potential of WSGNP colloidal solutions versus dispersion time; (c) schematic structure of water/GNP interface; (d) total potential of graphene sheets versus sheet-sheet distance for WSGNP colloidal solution by DLVO and van der Waals theories; (e) images of a freestanding film; and (f) electrical conductivity and sheet resistance (inset) of various WSGNP films with different dispersion times, according to one or more embodiments of the present disclosure.

FIG. 19a-19l illustrate (a-h) a dissolution process of dropping 5 mL of salted-SDWNT colloidal solution (2 mg mL$^{-1}$) into fresh water to observe its homogeneity in a diluting process; (i) UV-vis spectra of salted-SDWNT aqueous suspensions as treated with different salting times, where pure-SDWNT suspended in water was also presented as a control and all samples were diluted to 0.002 mg mL$^{-1}$ for the UV-vis measurement; (j) UV-vis-NIR spectra of aqueous "CoMoCAT"-type SWCNTs suspensions, which were previously dispersed by either NaClO/NaBr or each one of them as a dispersant, and samples were diluted 100 times for the measurements; (k, l) UV-vis-NIR spectra of aqueous UV-vis-NIR spectra of aqueous "CoMoCAT"-type SWCNT suspensions, where these SWCNT suspensions were dispersed by different NaClO/NaBr concentrations, i.e., from 0.67 to 0.000067 M (NaClO % in water) and where NaBr: NaClO ratio remained 1:1 in all samples, according to one or more embodiments of the present disclosure.

DETAILED DESCRIPTION

Figure 1:
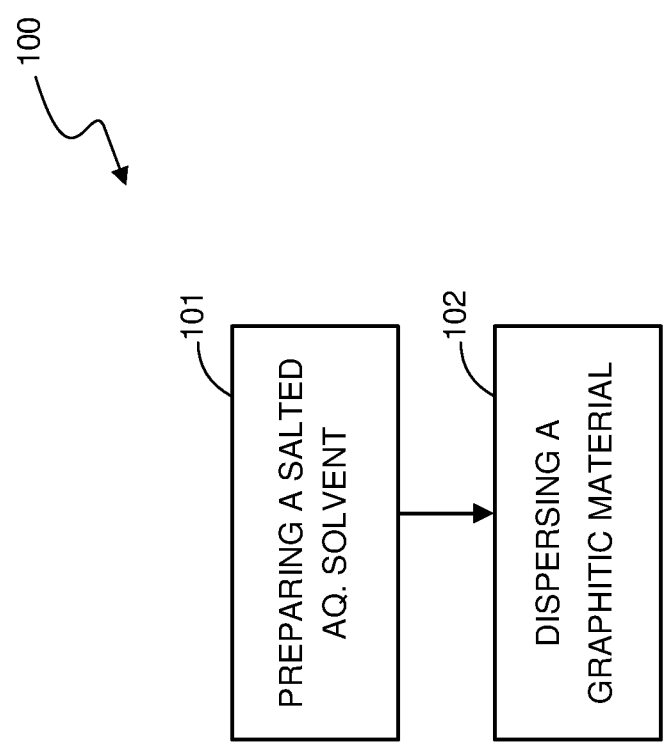
FIG. 1 is a flowchart of a method of preparing a colloidal solution, according to one or more embodiments of the present disclosure.

The invention of the present disclosure relates to methods of treating graphitic materials, as well as compositions and methods of preparing colloidal solutions with graphitic materials. In particular, the invention of the present disclosure relates to dispersing pristine graphitic materials in liquid media, such as, aqueous solvents and organic solvents, to form stable and homogenous colloidal solutions with high concentrations of graphitic materials. For example, embodiments include dispersing pristine graphitic material in liquid media to form colloidal solutions. Embodiments also include treating graphitic material for re-dispersion in liquid media to form colloidal solutions of pristine graphitic material. These colloidal solutions may be simply and quickly prepared in a manner that preserves the $sp^2$ hybridization of the graphitic materials and that does not require functionalizing or results in very limited functionalization of the graphitic material, nor any use of surfactants and/or detergents. In this way, the invention of the present disclosure provides colloidal solutions with high carrier mobility and high electrical conductivity.

The properties of graphene and/or graphitic materials make it an attractive candidate for use in various electrical applications as dispersions in a fluid medium. For example, electrical applications include, but are not limited to, batteries, sensors, supercapacitors, electrodes, and printable electronic circuits. Graphene has carrier mobility as high as 200,000 $cm^2 \cdot V^{-1} \cdot s^{-1}$ and advantageous mechanical properties, such as a tensile modulus as high as 1 TPa. It also has a high theoretical specific surface area (2,630 $m^2 \cdot g^{-1}$), a high thermal conductivity (~5000 $W \cdot m^{-1} \cdot K^{-1}$), and an ultrahigh optical transmittance (~97.7%). Graphene can be obtained by "peeling off" single defect-free graphene sheets from layered graphite crystals or by growing single graphene sheets directly on metals. Single-sheet production, however, is not viable for mass production, and more efficient and scalable routes to graphene production are urgently required. Few-layer graphene nanoplatelets (GNPs), previously called few-layer graphene, graphene nanosheets, and graphene powder that are produced by micromechanical cleavage, are important nanoscale building blocks for various applications. It is surface functionalization-free, typically in the form of few layers (<3), with an average in-plane dimension of around 10 μm.

Definitions

The terms recited below have been defined as described below. All other terms and phrases in this disclosure shall be construed according to their ordinary meaning as understood by one of skill in the art.

As used herein, "agitating" refers to any act of agitating, stirring, or mixing particles, in liquid media. While, in many embodiments, agitating will lead to a formation of a dispersion and/or colloidal solution, it is not a requirement of agitating.

As used herein, "colloidal solution" refers to any solution in which a material (e.g., graphitic material) is dispersed in liquid media.

As used herein, "contacting" refers to the act of touching, making contact, or of bringing to close or immediate proximity, including at the cellular or molecular level, for example, to bring about a physiological reaction, a chemical reaction, or a physical change (e.g., in solution, in a reaction mixture, in vitro, or in vivo). Contacting may refer to bringing two or more components in proximity, such as physically, chemically, electrically, or some combination thereof. Mixing is an example of contacting.

As used herein, "dispersing" and/or "re-dispersing" generally refers to any act of agitating, stirring, or mixing particles, in a liquid/dispersing medium, sufficient to form a dispersion.

As used herein, "graphitic material" refers to any allotrope of carbon including, but not limited to, one or more of graphene nanoplatelets, few-layers graphene, graphene monolayer sheets, bilayer graphene, graphene superlattices, graphene nanoribbons, graphene quantum dots, graphene oxide, carbon nanotubes (e.g., single-walled, double-walled, etc.), carbon nanobuds, carbon nanoribbons, and fullerenes.

As used herein, "preparing" refers to contacting two or more components.

As used herein, "pristine" graphitic materials refer to materials that have not been functionalized (e.g., via oxidation and/or covalent functionalization) and/or that preserve the $sp^2$ hybridization of the graphitic material.

As used here, "untreated" graphitic materials refers to materials that have not been treated as described in the present disclosure.

As used herein, "removing" refers to any process and/or method suitable for removing residual chemical species (e.g., ionic chemicals, supernatant, solvent, residual catalyst, etc.). For example, washing may include, but is not limited to, centrifuging and/or loading in a dialysis bag and/or contacting with a solvent.

Embodiments of the present disclosure describe a colloidal solution comprising a liquid medium and a graphitic material dispersed in the liquid medium sufficient to form a colloidal solution.

The liquid medium may include one or more of an aqueous solvent and an organic solvent. Generally, the liquid medium may include any solvent with a surface energy similar to the graphitic material to be or being dispersed. In many embodiments, the liquid medium may include a salted aqueous solvent. For example, the salted aqueous solvent may include a low concentration of sodium hypochlorite and sodium bromide (e.g., about 5 wt. % at about a 1:1 molar ratio). The salted aqueous solvent with sodium hypochlorite and sodium bromide has a surface energy of about 67.85 $mJ \cdot m^{-2}$ and graphite has a surface energy of about 70-80 $mJ \cdot m^{-2}$. The liquid medium may also include N-Methyl-2-pyrrolidone (NMP), which has a surface energy of about 69.50 $mJ \cdot m^{-2}$. In other embodiments, the liquid medium may include one or more of water, dimethylformamide (DMF), tetrahydrofuran (THF), toluene, ethyl acetate, isopropanol, ethanol, acetone, methyl ethyl ketone, chloroform, 2-aminobutane, and other polar solvents.

The graphitic materials may include one or more of graphene nanoplatelets, few-layers graphene, graphene monolayer sheets, bilayer graphene, graphene superlattices, graphene nanoribbons, graphene quantum dots, graphene oxide, carbon nanotubes (e.g., single-walled, double-walled, etc.), carbon nanobuds, carbon nanoribbons, and fullerenes. In many embodiments, the graphitic material includes pristine graphitic materials. In general, pristine graphitic materials have not underwent chemical modification via oxidation and/or functionalization (e.g., covalent functionalization), for example. In addition, pristine graphitic materials preserve the $sp^2$ hybridization. These pristine graphitic materials may be treated (e.g., per the methods discussed below with respect to FIG. 2) or untreated (e.g., such as the graphitic materials discussed below with respect to FIG. 1). In many embodiments, ions adsorb onto pristine graphitic solutions (e.g., including both treated and untreated graphitic solutions) to generate electrostatic repulsion between graphitic sheets and stabilize the colloidal solution.

In other embodiments, the graphitic material may be chemically modified (e.g., oxidation and/or covalent functionalization) and/or combined with a surfactant. For example, in some embodiments, direct mechanical exfoliation yielding soluble graphene may be achieved by selecting dispersing liquid mediums, such as N-methyl-2-pyrrolidone (NMP, $C_5H_9NO$), with surface free energies similar to graphene. In other embodiments, acid protonation by chlorosulphonic acid (HSO$_3$Cl) or concentrated sulfuric acid (H$_2$SO$_4$) may be used to create a repulsion between layers, successfully dispersing high concentrations of graphene (up to 2 mg·mL$^{-1}$). Moieties and polymers, such as pyrene derivative 1-pyrenebutyrate (PB$^-$), dyes, 7,7,8,8-tetracyanoquinodimethane (TCNQ), porphyrin, and poly(3,4-ethylene-dioxythiophene)/poly(styrenesulfonate) (PEDOT/PSS), may be used to facilitate the dispersion of graphene via π-π stacking. A detergent and/or surfactant, such as, bolaamphiphile or sodium dodecyl-benzene sulfonate (SDBS), may be added to dispersions of graphitic materials in water to overcome the high surface energy of water.

The colloidal solution may include a complete and/or substantially complete dispersion of graphitic materials in the liquid medium. In addition, the colloidal solution may be stable and homogenous with high concentrations of graphitic material. For example, the colloidal solution may be stable in liquid form and capable of moving freely for several weeks (e.g., at least 4 weeks), without any substantial evidence of phase separation (e.g., no phase separation). The concentrations of graphitic material in the colloidal solution may range up to about 5 mg·mL$^{-1}$. In many embodiments, the sp$^2$ hybridization of pristine graphitic materials is preserved in the colloidal solution, retaining, among other things, the advantageous mechanical and electronic properties of graphitic material (e.g., high carrier mobility and/or high electrical conductivity). In other embodiments, the sp$^2$ bonds may not be completely and/or fully preserved, but are slightly modified.

FIG. 1 is a flowchart of a method of preparing a colloidal solution, according to one or more embodiments of the present disclosure. In many embodiments, the colloidal solution is an aqueous colloidal solution of graphitic material (e.g., graphitic nanoparticles).

At step 101, a salted aqueous solvent is prepared. In many embodiments, the salted aqueous solution may be prepared with a low concentration of sodium hypochlorite and sodium bromide (e.g., about 5 wt. %). The sodium hypochlorite and sodium bromide may be included in the aqueous solvent at a 1:1 molar ratio. In other embodiments, N-Methyl-2-pyrrolidone (NMP) may be utilized as the liquid medium. Although salted aqueous solvents based on sodium hypochlorite and sodium bromide, and liquid mediums including NMP are provided, the liquid medium may be any solvent with a surface energy similar to the graphitic material to be or being dispersed, including aqueous and/or organic solvents. In addition, the liquid medium may be prepared via any methods known to a person skilled in the art for preparing solutions.

At step 102, a graphitic material is dispersed in the salted aqueous solvent. Any of the graphitic materials discussed herein—for example, pristine graphitic materials, both treated and/or untreated—may be utilized with respect to this step. In many embodiments, the graphitic material may be dispersed in liquid media via sonication (e.g., bath sonication), wherein sound energy is applied to disperse particles and create a colloidal solution. The dispersing via bath sonication may substantially and/or completely disperse graphitic materials in a liquid medium. The dispersing frequency may include ultrasonic frequencies (e.g., frequencies greater than 20 kHz) or at frequencies below ultrasonic frequencies (e.g., frequencies less than 20 kHz). The dispersing may be complete and a colloidal solution formed after short dispersal times (e.g., a few minutes). For example, the colloidal solution may be formed by bath sonication after about 9 sec. In other embodiments, the graphitic materials may be dispersed via one or more of tip sonication, mechanical mixing, manual/machinery stirring, magnetic stirring, microwave heating, shaking, and any other shaking or mechanical motions that impart motions to the mixtures. While the above discussion refers to dispersing graphitic material via sonication and other methods, the graphitic materials may be dispersed in a salted aqueous solvent with or without sonication. For example, in other embodiments, the graphitic material may be dispersed spontaneously (e.g., without sonication).

Figure 2:
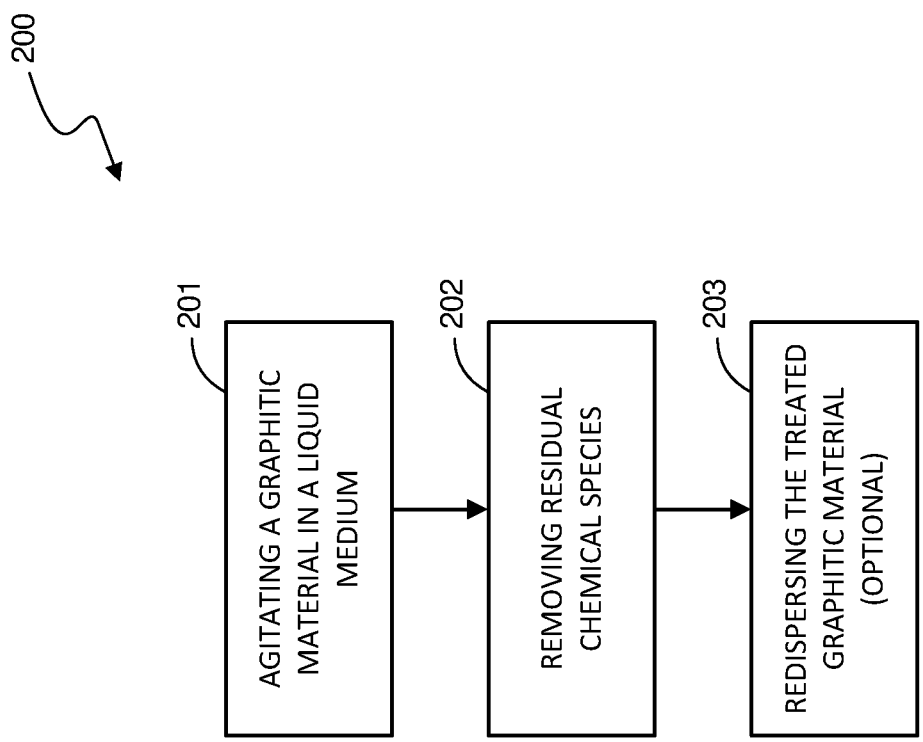
FIG. 2 is a flowchart of a method of treating a graphitic material, according to one or more embodiments of the present disclosure.

FIG. 2 is a flowchart of a method of treating a graphitic material (e.g., for re-dispersing), according to one or more embodiments of the present disclosure.

At step 201, a graphitic material is agitated in a liquid medium. Any of the graphitic materials and liquid media previously described may be utilize with respect to this step. In many embodiments, step 201 includes agitating graphitic nanoparticles in a salted aqueous solvent. Agitating may occur via sonication (e.g., bath sonication) at ultrasonic frequencies (e.g., frequencies greater than or equal to 20 kHz) or at frequencies below ultrasonic frequencies (e.g., frequencies less than 20 kHz). Agitating with respect to step 201 is similar to dispersing with respect to step 102. For example, in many embodiments, agitating with respect to step 201 may completely and/or substantially disperse the graphitic materials sufficient to form a colloidal solution. However, unlike dispersing, agitating does not require the formation of a dispersion and/or colloidal solution. Instead, step 201 only requires agitating, stirring, and/or mixing particles in a liquid medium.

At step 202, residual chemical species are removed to obtain a treated graphitic material. For example, in some embodiments, residual chemical species may include one or more of ionic chemicals, excess salts, supernatant, solvent, and residual catalyst introduced during processing of the graphitic material. In many embodiments, removing includes washing and/or drying the agitated graphitic material. Washing may include one or more of centrifuging and dialyzing the agitated graphitic material to remove impurities and/or residual chemicals. In this way, washing may form a purified graphitic product and/or substantially purified graphitic product. For example, the agitated graphitic material may be centrifuged to remove the liquid medium (e.g., dispersion medium). In some embodiments, the agitated graphitic material is centrifuged at about 5000 rpm for about 5 minutes. Dialyzing may be performed to remove residual chemicals. In some embodiments, a dialysis membrane is submerged and/or immersed in deionized water and changed periodically (e.g., about every 12 hours for 10 days). In some embodiments, washing may produce a water-soluble graphitic product (e.g., water-soluble graphene nanoplatelets). Drying may be performed before and/or after washing. For example, drying may include freeze-drying the washed (e.g., and agitated) graphitic materials to obtain the treated graphitic materials. In some embodiments, freeze-drying the washed graphitic material may produce graphitic material in powder form that may be re-dispersed to form colloidal solutions.

At step 203, the treated graphitic material may optionally be re-dispersed. The treated graphitic material may be re-dispersed in liquid media including, but not limited to, one or more of NMP, water, methanol, monomer (e.g., oil), and tetrahydrofuran (THF). In many embodiments, the treated graphitic material may be re-dispersed in water. In some embodiments, the ability of the treated graphitic materials to re-disperse in liquid media may decrease as the polarity of the liquid medium decreases. These liquid media are not limiting, as any of the liquid media described herein may be utilized with respect to this step. In some embodiments, the treated graphitic material may be re-dispersed via bath sonication. In other embodiments, the treated graphitic material may be re-dispersed spontaneously upon being added to the solvent, without any agitating and/or dispersing. In other words, the treated graphitic material may be dispersed in liquid media with or without sonication or via other methods. The treated graphitic materials re-dispersed in liquid media may form stable and homogenous colloidal solutions with high concentrations of pristine graphitic materials. Step 204 is optional.

In comparing the methods of FIGS. 1 and 2, the method of FIG. 1 and related discussion may be utilized to quickly and easily form dispersions of graphitic materials in liquid media with surface energies similar to the surface energy of the graphitic material. In many embodiments, for example, the liquid medium is one or more of a salted aqueous solvent and/or NMP. On the other hand, the method of FIG. 2 may be utilized to re-disperse graphitic materials in liquid media with surface energies that are dissimilar to the surface energy of the graphitic material. For example, the method of FIG. 2 may be utilized to form dispersions of graphitic materials in water, which generally requires detergents and/or surfactants to form dispersions of graphitic materials due to its high surface energy. In addition, the method of FIG. 2 and related discussion may be utilized to store graphitic materials for re-dispersion in the future. These are examples of differences between the methods of FIGS. 1 and 2 and related discussion and are not limiting.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example 1

Dispersion of GNPs in liquid media is a crucial step for various applications. This Example provides a highly stable few-layer graphene nanoplatelet dispersion in various solvents. A simple, scalable method of producing a water-soluble few-layer graphene powder by first dispersing few-layer graphene nanoplatelets (GNPs) in a NaClO/NaBr-salted solution is presented. In particular, a simple, nondestructive method is presented for preparing stable aqueous colloidal solutions with GNP powder quickly dispersed in about 5 wt. % sodium-hypochlorite— (NaClO) and sodium-bromide-(NaBr) salted solvent by bath sonication. This method makes it possible to easily prepare a highly concentrated colloidal solution (about 1 mg·ml$^{-1}$) of GNPs that can easily be re-dispersed in various solvents (treated GNPs). The aqueous suspension that was prepared remained stable for longer than a few weeks.

Few-layer graphene nanoplatelets (GNPs, N002-PDR), purchased from Angstronmaterials Materials Inc., were used as received. Average lateral dimensions of GNPs were 10 um and had 95% carbon content. 5 wt. % Aqueous sodium hypochlorite at 5 wt. % (NaClO) and sodium bromide (NaBr) powders were purchased from RICCA Chemical Company. Methanol, NMP, THF and polymer monomer (1,6-Hexanediol ethoxylate diacrylate) were purchased from Sigma-Aldrich Company. Water was purified by distillation in a Milli-Q (Advantage A10 model) system. UV-vis measurements of colloidal solutions were recorded from 800 nm-190 nm at 1-nm intervals using a Cary100 UV-Visible spectrophotometer.

The properties of dispersions are highly dependent upon the nature of the material and the dispersing media interface. All graphitic carbon nanostructures without chemical modification are highly hydrophobic. This hydrophobicity prevents them from forming stable dispersions in aqueous media. Efforts aiming to resolve this limitation are increasing because of the growing interest in applications that require water-based dispersion to promote ecologically friendly processes. Two major methods have been developed to disperse few-layer graphene powder in aqueous media: 1) chemical modification by introducing water-solubilizing functional groups and 2) surfactant wrapping of the graphene sheets to create hydrophilic surfaces. Chemical modification, which includes oxidation or covalent functionalization by introducing sp$^3$-hybridized sites into the graphitic structure, leads to major alterations in the electronic properties of the structure. Surfactants facilitate the quick dispersion of graphene nanoplatelets (GNPs) in water without destroying the graphitic structure; however, an excessively thick layer of surfactant accumulates on the surface of the structure. Thus, the use of surfactants or other methods is not preferred when the purity of GNPs is critical.

Figure 3:
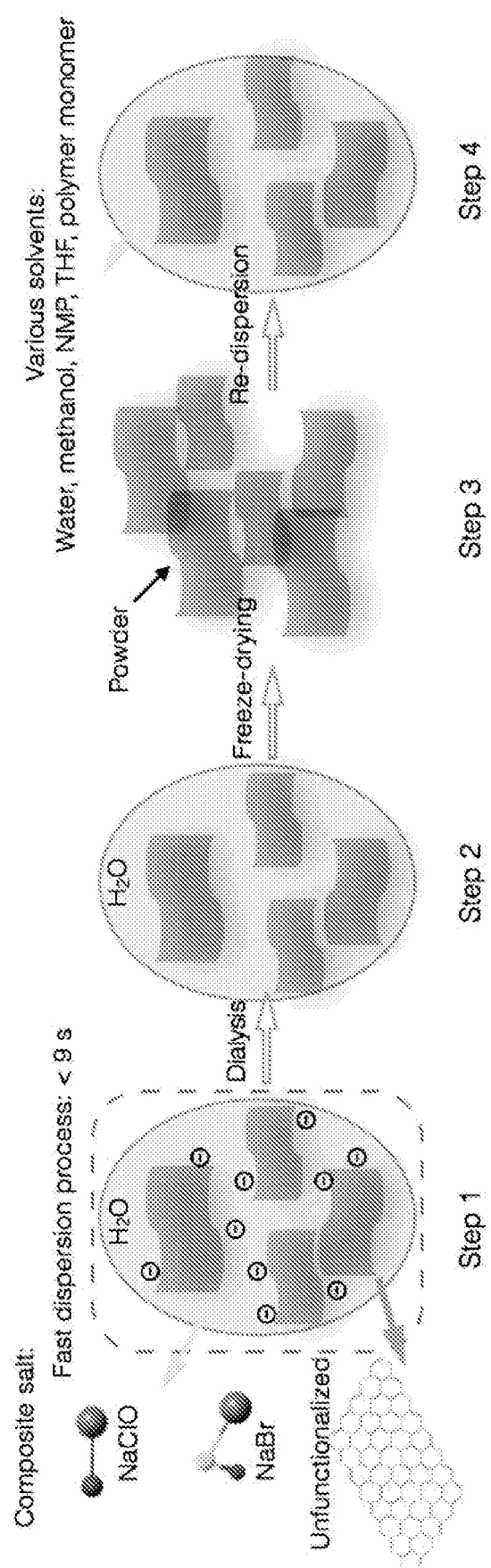
FIG. 3 is a schematic diagram of a method of dispersing graphitic materials, according to one or more embodiments of the present disclosure.

A new method is provided for preparing stable GNP colloidal solutions in aqueous media that does not destroy the sp$^2$-hybridization of graphene and does not involve the formation of a thick layer of surfactant on the surface of the structure. As illustrated in FIG. 3, the method involves bath sonication of the GNP powder in a sodium-hypochlorite— (NaClO) and sodium-bromide— (NaBr) salted aqueous solution (NaClO:NaBr 1:1 molar ratio) for 60 min (Step 1). The dispersed GNP product is subsequently washed with water via centrifugation and dialysis for 15 d (Step 2). Once the washed GNPs (treated) are freeze-dried (Step 3), they can easily be re-dispersed in various solvents by mild bath sonication to form a stable GNP colloidal solution (Step 4).

Figure 4B:
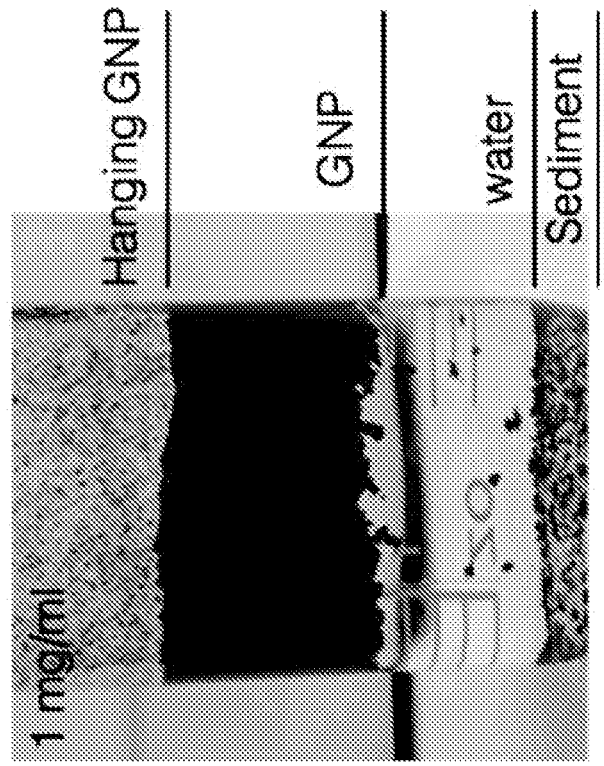
FIGS. 4a-4b are images of GNP/water colloidal solutions, including (a) an image of a 1-mg·ml$^{-1}$ treated GNP/water colloidal solution and (b) a 1-mg·mL$^{-1}$ pristine GNP/water colloidal solution, both of which were taken about one month after preparation of the solutions, according to one or more embodiments of the present disclosure.
Figure 4A:
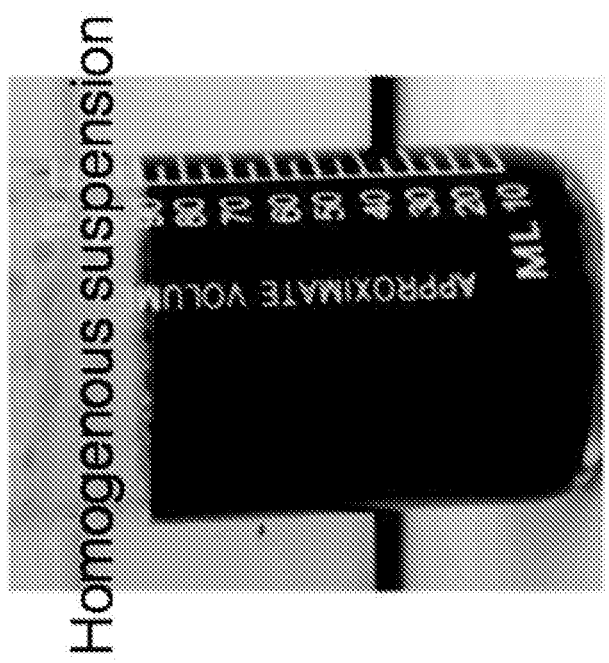

FIG. 4a shows re-dispersion of treated GNPs in pure water (step 4), which remained as a stable, homogenous colloidal solution (1 mg·ml$^{-1}$) for several weeks. In comparison, FIG. 4b shows a pristine GNP (untreated) aqueous colloidal solution of the same concentration, which was not homogenous and features multiple GNP aggregates on the surface of the bottle and agglomerated GNPs. These photos were taken several weeks after preparation of the solutions. Dispersion of GNPs in water is incompatible due to strong van del walls forces between particles. Although treatment of GNPs left some residual salts, reducing the purity of the solution to some degree, the adsorption of anions (Br$^-$, ClO$^-$) by GNPs likely generated electrostatic repulsion between graphitic sheets that eventually stabilized the final aqueous colloidal solution.

During the pre-treatment step (step 1), pristine GNPs have yet to be dispersed correctly in the salted solvent and thus can be efficiently treated. It was suspected that the effective dispersion of pristine GNPs in the salted solution could be explained by a close match in surface energies between the GNPs and the NaClO/NaBr-salted solvent. Knowing that graphite has a surface energy of about 70-80 mJ·m$^{-2}$, the surface energy of the NaClO/NaBr-salted solution was measured to be about 67.85 mJ·m$^{-2}$, verifying the prediction. Similarly, N-Methyl-2-pyrrolidone (NMP) was found to be an effective solvent for easily dispersing GNP due to the close match in their surface energies, (NMP has a surface energy of 69.50 mJ·m$^{-2}$).

Figure 5A:
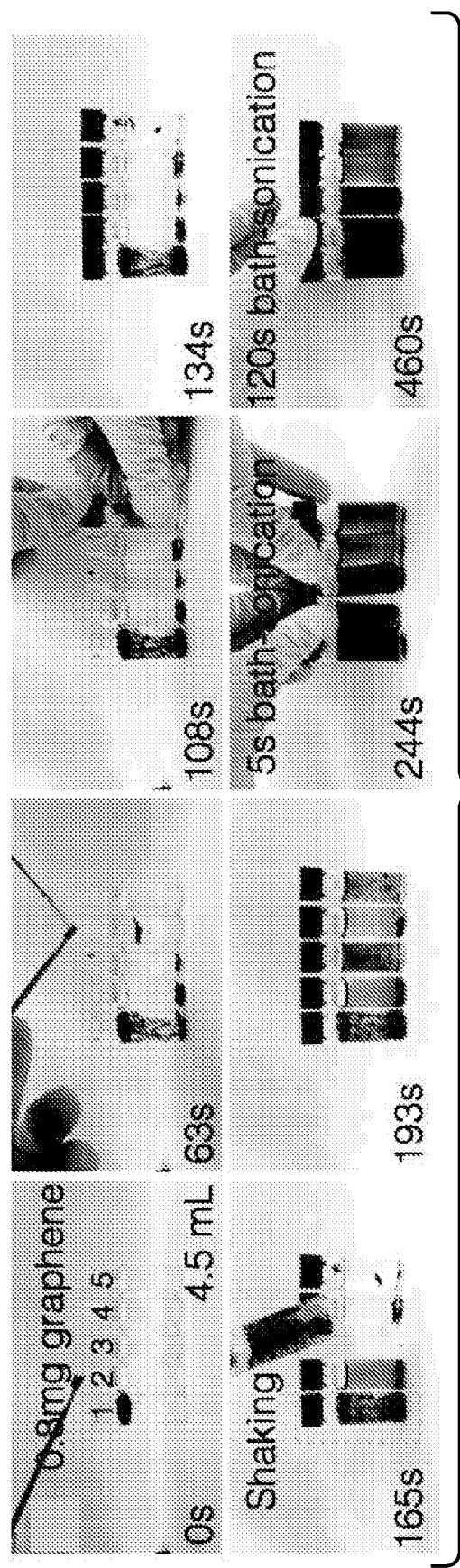
FIGS. 5a-5e are (a) images of dispersing treated freeze-dried GNP in different liquid media; (b) ultraviolet visible spectra of as-prepared GNP colloidal solutions as measured instantly; (c) ultraviolet visible spectra showing absorbance changes at 660 nm for treated GNP in NMP, water, methanol, oil, and THF suspensions; (d) graphical views of calculated absorption coefficients (a) for each solvent; (e) graphical views of absorbance versus concentration of treated GNP in NMP stabilized for 40 hours showing a linear relationship, according to one or more embodiments of the present disclosure.
Figure 5B:
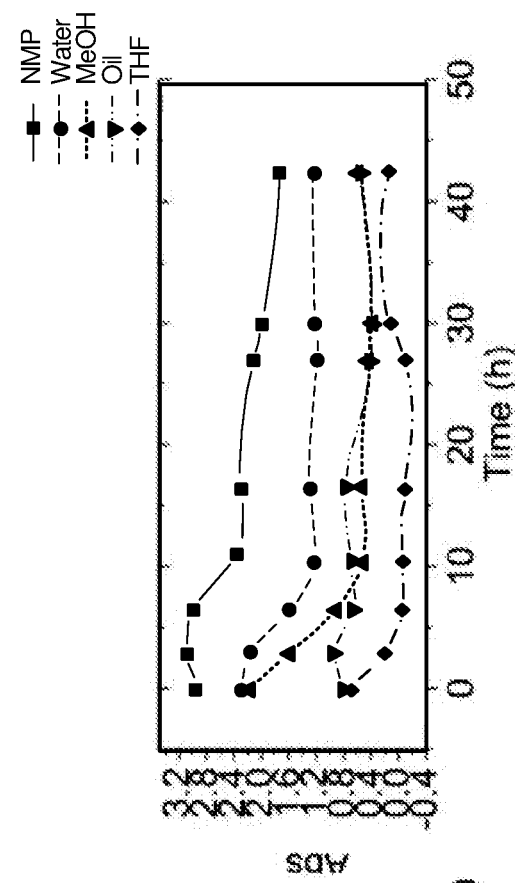
Figure 5C:
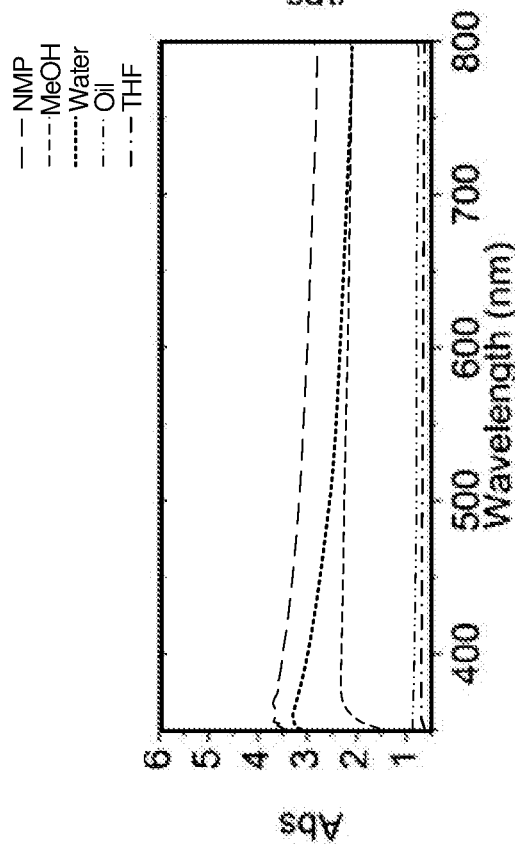
Figure 5D:
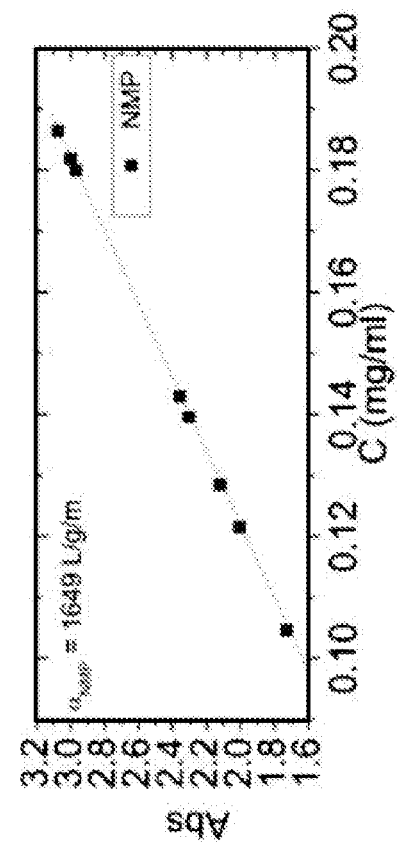
Figure 5E:
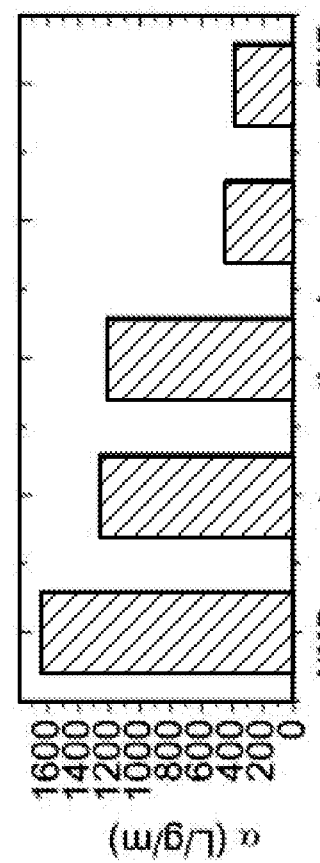

The treated GNP colloidal solution was freeze-dried to obtain GNP powder and then ~0.8 mg was re-dispersed in ~4.5 ml of water, methanol, NMP, Tetrahydrofuran (THF), or polymer monomer (oil) (0.18 mg·ml$^{-1}$ concentration of GNP powder) solvents to test their dispersibility (FIG. 5a). Solvents had the following polarities: water (1.000)>methanol (0.762)>NMP (0.360)>(THF) (0.207)>polymer monomer (0.001). It was found that the treated, freeze-dried GNP powder was extremely compatible with water, spontaneously dispersing within about 193 s. After two rounds of 5 s and one round of 120 sec sonication, the powder had totally dispersed in the water with no phase separation overnight. Dispersibility appeared to decrease with decreasing polarity, as evidenced by the large aggregates visible with the naked eye in bottles containing THF and polymer monomer solvents (bottles 4 and 5, respectively). The Beer-Lambert law was used to calculate the molar absorption coefficients, α, of each colloidal solution to evaluate their dispersibility:

$$A = \alpha C D \quad (1)$$

where A is the absorbance, C is the concentration of the solute (g·L$^{-1}$), and D is a 1-cm pathlength. The absorption coefficient α (L·g$^{-1}$ m$^{-1}$) was calculated based on the achieved experimental parameters A, C, and D. FIG. 5b shows the absorbance of each colloidal solution as calculated by ultraviolet-visible (UV-vis) spectroscopy at 660 nm for 40 h (FIG. 5c). Treated GNP dispersed best in NMP and water, and worst in THF and oil. FIG. 5d shows the absorption coefficients of treated GNP powders in each solvent. The absorption coefficient of NMP was highest at about 1649 L·g$^{-1}$ m$^-$, followed by water and methanol between abpit 1200-1100 L·g$^{-1}$·m$^{-1}$; the oil and THF had the lowest value at about 400 L·g$^{-1}$·m$^{-1}$. Thus dispersibility of GNP followed NMP>water>methanol>monomer>THF. Over the 40 h stabilization time, the relationship between the absorbance and the calculated concentration of NMP (mg·ml$^{-1}$) was linear (FIG. 5e).

Example 2

This Example provides ultrafast dispersion of few-layer graphene (e.g., few-layer graphene nanoplatelets (GNPs)) in a low-concentration sodium hypochlorite and sodium bromide salted aqueous solvent for highly concentrated aqueous colloidal solutions. In particular, this Example provides methods of forming and compositions of stable, highly concentrated aqueous graphene dispersions. Despite interest, there has been limited success in developing a method that ensures the total dispersion of non-oxidized, defect-free graphene nanosheets in, for example, water. This Example demonstrates that GNPs can form highly concentrated aqueous colloidal solutions after they have been pretreated in a low-concentration inorganic sodium hypochlorite and sodium-bromide salted aqueous solvent. For example, GNPs can be suspended in a low-concentration inorganic sodium-hypochlorite— (NaClO) and sodium-bromide— (NaBr) salted aqueous solvent. GNP colloidal solutions at remarkably high concentration (5 mg·ml$^{-1}$) were obtained within several minutes by bath sonication. This method retained the graphitic structure, making it non-destructive, as evidenced by nuclear magnetic resonance spectroscopy, X-ray photoelectron spectroscopy, and Raman spectroscopy. Vacuum-filtrated freestanding films demonstrate an electrical conductivity as high as 3000 S·m$^{-1}$. This dispersion technique also may be utilized for dispersing other types of graphitic materials, including fullerenes, single-/double-/multi-walled carbon nanotubes, graphene nanoribbons, etc.

Materials and Methods

Few-layered graphene powder (N002-PDR, Angstronmaterials Inc) and graphene powder (grade 4, Cheaptubes) were used. N002-PDR one was used throughout this work unless otherwise mentioned. NaClO and NaBr powders were used as the bleaching components (RICCA Chemical Company). NaClO (about 5 wt. % in water) was used as received. Water used for experimentation was purified by distillation in a Milli-Q (Advantage A10 model) system.

To prepare WSGNPs in aqueous NaClO/NaBr salted colloidal solutions, graphene powder and bleach/water were mixed by a regular bath ultrasonic cleaner (Model: 8510E-MTH, Branson Company). The sonication process worked at the specification of about 250 W and about 44 KHz at room temperature. Samples were placed randomly in any location within the sonication bath. Sonication time ranged between 10 and 160 min. An Eppendorf 5810 centrifuge was then used to centrifuge the WSGNP/salts/water at about 5000 rpm for about 5 min to remove the bleach/water (e.g., NaClO/NaBr/water) mixture. Corning polypropylene (PP) centrifuge tubes (50 mL, outer diameter: 29.1 mm) were used for the centrifugation. Afterward, the resultant WSGNP slurry and ~100 mL of pure water were loaded into a Spectra/Por1 dialysis membrane (64-mm tubing diameter and 6-8-kD pore width) to remove residual chemicals. These dialysis bags were immersed in 5000 mL of deionized water, which was changed about every 12 h for 10 d. The concentration of the purified WSGNP/water colloidal solution was adjusted to its original concentration (1 mg·ml$^{-1}$). Vacuum filtration to obtain free-standing WSGNP films was performed using a 47-mm diameter vacuum filter holder assembly (Wheaton), which was coupled with a 47-mm diameter, polycarbonate filter with 0.05-μm pores (Whatman plc). The filtration took about 3 h, leaving a wet membrane supported by the PC filter. This "wet-cake" was supported by another piece of polycarbonate membrane and was laminated between several layers of tissue papers and then placed between two metal cells (2.4 kg for each, pressure on the film: 0.36 kPa) to ensure that the resultant WSGNP film was compact. The drying process was conducted in a vacuum oven at about 100° C. for about 12 h.

Figure 6:
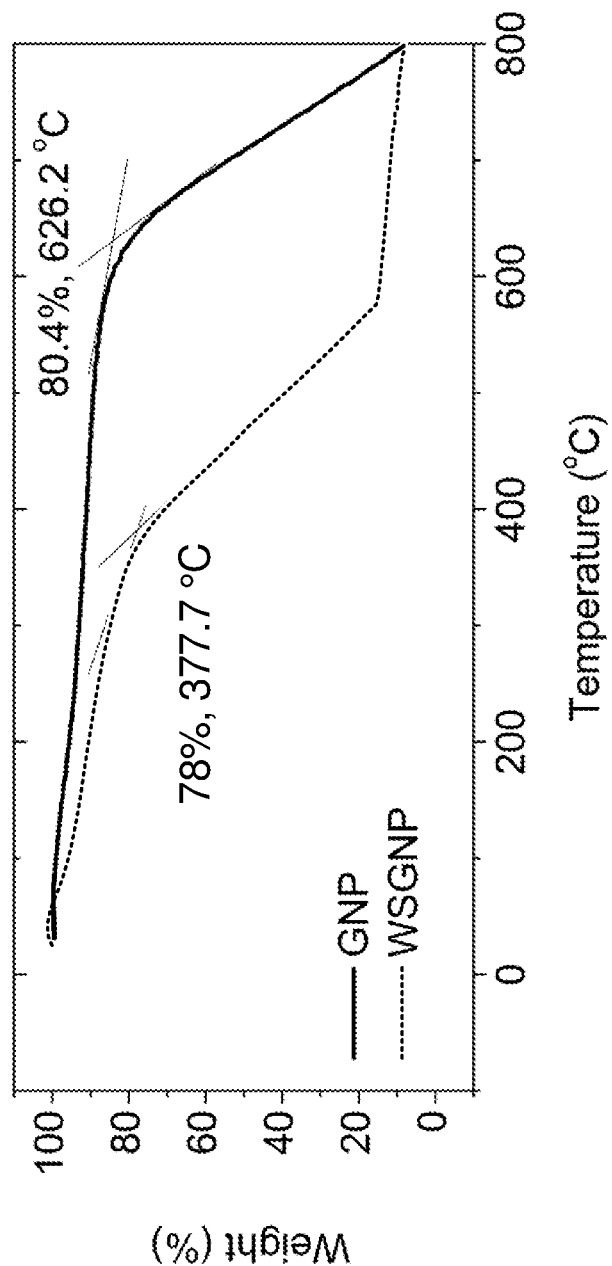
FIG. 6 is a TGA of native GNP and WSGNP powders, according to one or more embodiments of the present disclosure.
Figure 7:
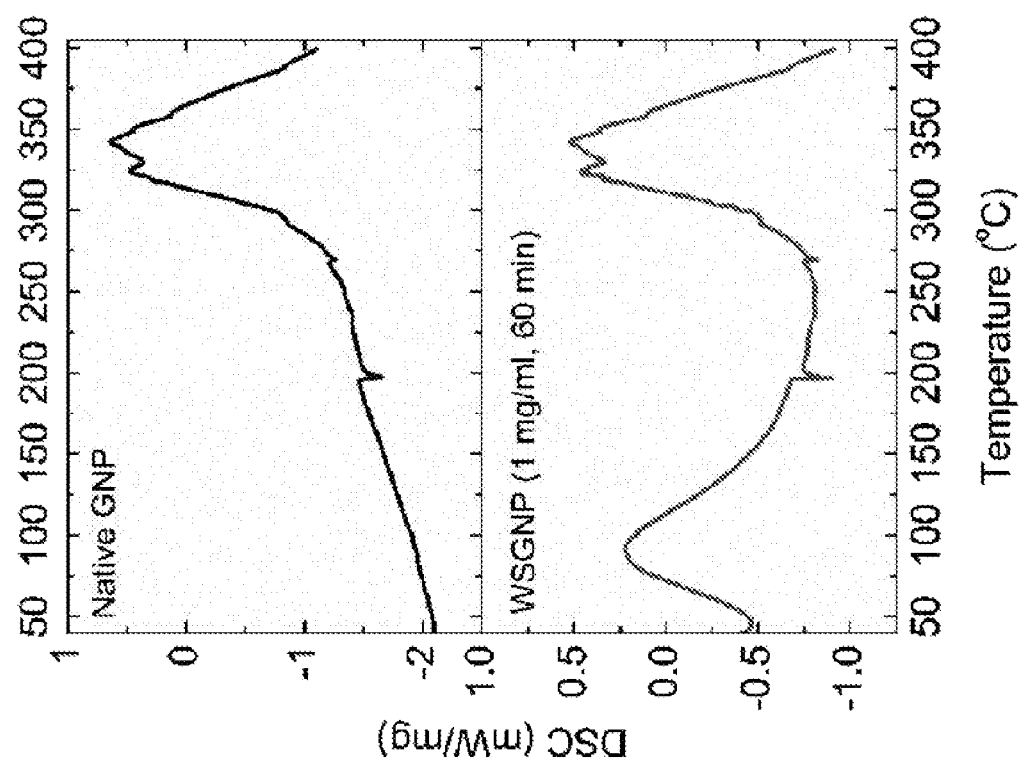
FIG. 7 is a DSC of native GNP and WSGNP powders, according to one or more embodiments of the present disclosure.

Both pristine GNP and WSGNP were characterized by thermogravimetric analysis (TGA) and differential scanning calorimetry (DSC). TGA was scanned by a NETZSCH TG, 208 F1 instrument from 27 to 880° C. at 20 K/min under nitrogen atmosphere protection. DSC was performed on a NETZSCH DSC 204 F1 Phoenix instrument, which was operated from 25 to 400° C. at 25 K/min under nitrogen atmosphere. FIG. 6 shows the thermogravimetric (TG) plot of our GNP material together with that of WSGNP after post-treatment. The figure showed a mass loss (~10%) below 100° C., which was attributed to the removal of adsorbed water and NaClO (boiling point at 101° C.). It also showed a slower, steady mass loss (~12%) over the whole temperature range to 377.7° C., which was likely caused by the removal of oxygen functionalities. The final weight of WSGNP was 8.3% of the initial weight, which was believed to be from the attached inorganic salts (NaClO, NaBr) on the WSGNP that were introduced during dispersion. The DSC scan of WSGNP is shown in FIG. 7. Compared with the pristine GNP, WSGNP has an additional peak at ~100° C. This peak was very likely introduced by volatile substances, possibly NaClO, given that the DSC of graphite or graphene oxide did not have this peak in the literature. The expected endothermic peak associated with water removal was hidden by another exothermic process that was not identified at this point. Conclusively, both TGA and DSC demonstrated how WSGNP differs from graphene oxide, which had a 65% weight loss at 230° C.

TEM images were taken using a Tecnai Twin microscope (FEI). TEM samples were prepared from GNP/water and WSGNP/water solutions at 1 mg ml 1 for 60 min. SAED pattern was obtained from TEM images. SANS for the dispersed samples were measured at rest at the Laboratoire Leon Brillouin (LLB Saclay) on the spectrometer PAXY, by varying the wavelength 1 and the sample-to-detector distance D. The three configurations defined by I=6 Å at a sample-to-detector distance of 1.2 m, I=6 Å at a sample-to detector distance of 6.7 m and I=15 Å at a sample-to-detector distance of 6.7 m enable to cover a total q-range from $3 \cdot 10^{-3}$ Å$^{-1}$ to 0.4 Å$^{-1}$. Samples were measured in calibrated quartz cells of 1 mm pathway in $H_2O$ as solvent. The 2D patterns were reduced to 1D spectra I(q) versus q after a radial averaging around the center of the scattered beam. Standard corrections by sample thickness, neutron beam transmission, and empty cell signal subtraction, detector efficiency, electronic background and subtraction of incoherent scattering were applied to get the scattered intensities on an absolute scale (cm$^{-1}$). Data reduction was done using a home-made software "Pasinet". NMR spectroscopy on dried graphene powders were measured at 18 kHz with samples encapsulated in a 3.2-mm rotor with an Ultrashield 400 WB plus (Bruker Corporation). Raman measurements were conducted on a LabRAM ARAMIS using a 473-nm laser source. Zeta potentials of WSGNP dispersions were measured by a zeta-sizer (Malvern Company). The FT-IR spectroscopy measurements were performed on a Nicolet iS10 (Thermoscientific Inc). Dried powders from WSGNP dispersions were produced using a Christ Alpha 1-2 LD plus freeze dryer (Martin Christ Company). We conducted the XPS studies in a Kratos Axis Ultra DLD spectrometer equipped with a monochromatic Al Ka X-ray source (hv=1486.6 eV) operating at 150 W with a multichannel plate with a delay line detector under a vacuum of ~10$^{-9}$ mbar. All spectra were recorded using an aperture slot of 300 mm 700 mm. Survey spectra were collected using a pass energy of 160 eV and a step size of 1 eV. A pass energy of 20 eV and a step size of 0.1 eV were used for the high-resolution spectra. Samples were mounted in the floating mode to avoid differential charging. Charge neutralization was required for all samples. Binding energies were referenced to the sp$^2$ hybridized (C=C) carbon with the C is peak from the carbon nanomaterials set at 284.5 eV. Ion chrotomography was measured with an ICS-3000 t purchased from Dionex Corporation, and measurements were performed with a 4×250-mm analytical tube (IonPac AS15, for anions) from the same company. Ultravioletevisible (UVevis) spectroscopy measurements on WSGNP powders in various solvents were recorded from 800 nm to 190 nm at 1-nm intervals by a Cary100 ConC UV-vis spectrophotometer (Agilent Technologies). Sheet resistances were measured using a CMT-SR2000N four-probe system (probe space 1 mm, Materials Development Corporation). Measurements were taken at 10 different locations along each sample and the average value was reported. To ensure accuracy, surface tensions were averaged based on 20 separate measurements using the dynamic surface-tension-ring method at 20.4° C. with a Kruss K100 tensiometer (Kruss Company).

Results

Figure 8:
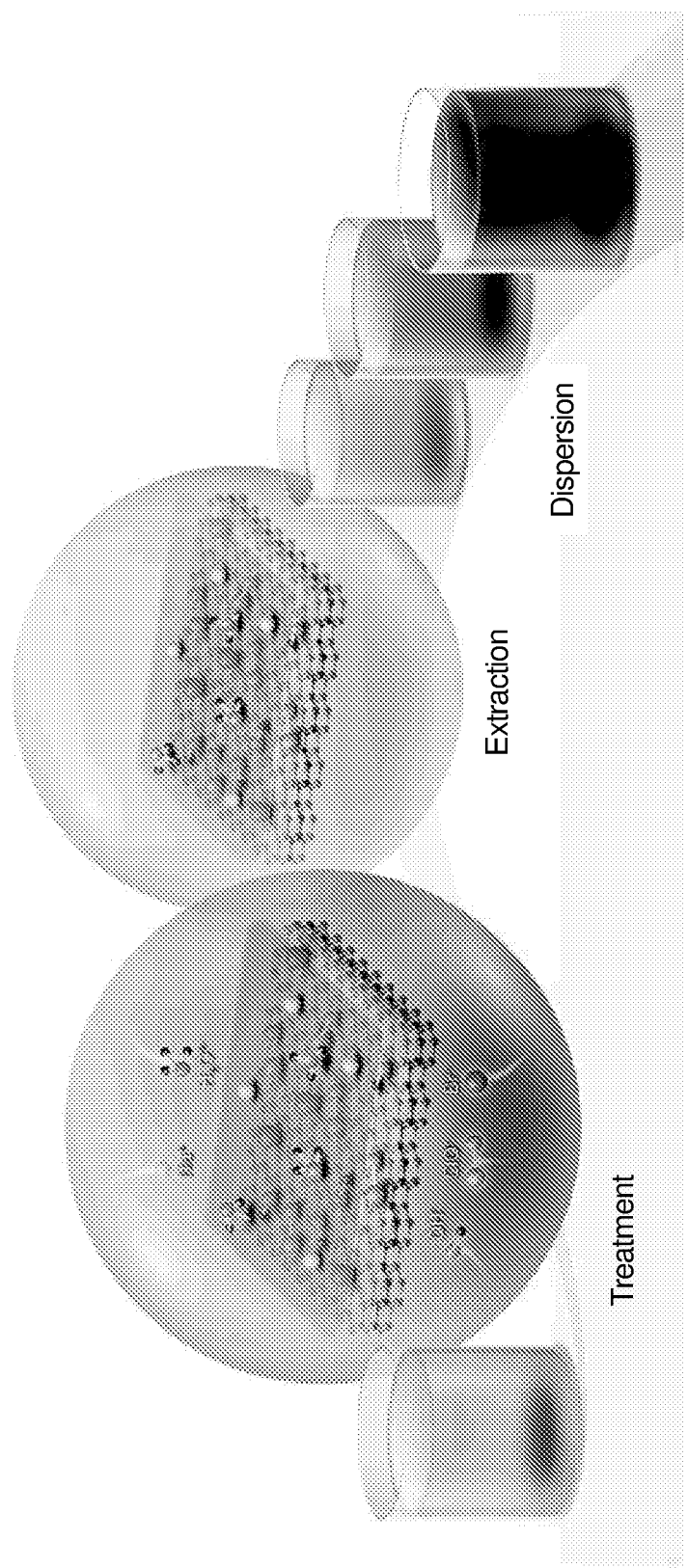
FIG. 8 is a schematic diagram of a dispersion protocol wherein a yellow solution indicates aqueous sodium hypochlorite and a sodium bromide salted solution used to disperse difference concentrations of GNPs followed by extraction of WSGNPs, according to one or more embodiments of the present disclosure.

This Example describes a very simple and efficient procedure to disperse graphene via regular ultrasonic treatment of GNP powder in water, aided by commercially available inorganic salts: such as, sodium hypochlorite and sodium bromide. GNP powder with fewer than three layers and in-plane dimensions of ~10 μm was used. It is crystalline, non-polar, and platelet graphitic materials that are produced via a "top-down" process. The dispersion medium included water with two salts, about 5 wt. % (0.67 M) sodium hypochlorite (NaClO) to which sodium bromide (NaBr) was added at a 1:1 molar ratio with respect to NaClO, as illustrated in FIG. 8. The salted solution contained 1.34 M salts (0.67 M of NaClO and 0.67 M of NaBr). After the appropriate dispersal time, all samples were centrifuged at 5000 rpm for about 5 min to remove all dispersion medium. Then, new water was added into the obtained treated-GNP slurry, and loaded into a dialysis bag, which was dialyzed in pure water for about 10 d to remove residual ionic chemicals. The final product, which can be easily later dispersed in water, was called water-soluble GNP (WSGNP).

The dispersion process of GNP powder was demonstrated at a concentration of 1 mg·mL$^{-1}$. Dispersion of the same amount of GNP powder in pure water was also demonstrated for a comparison. Sonication caused graphene to quickly disperse in the salted solvent (~9 s). The dispersion process was conducted in a regular bath sonicator operating at a configuration of 250 W, 44 KHz at room temperature. In contrast, in pure water, 1-mg·mL$^{-1}$ GNP powder remained floating on the surface, suggesting poor dispersion.

Figure 9:
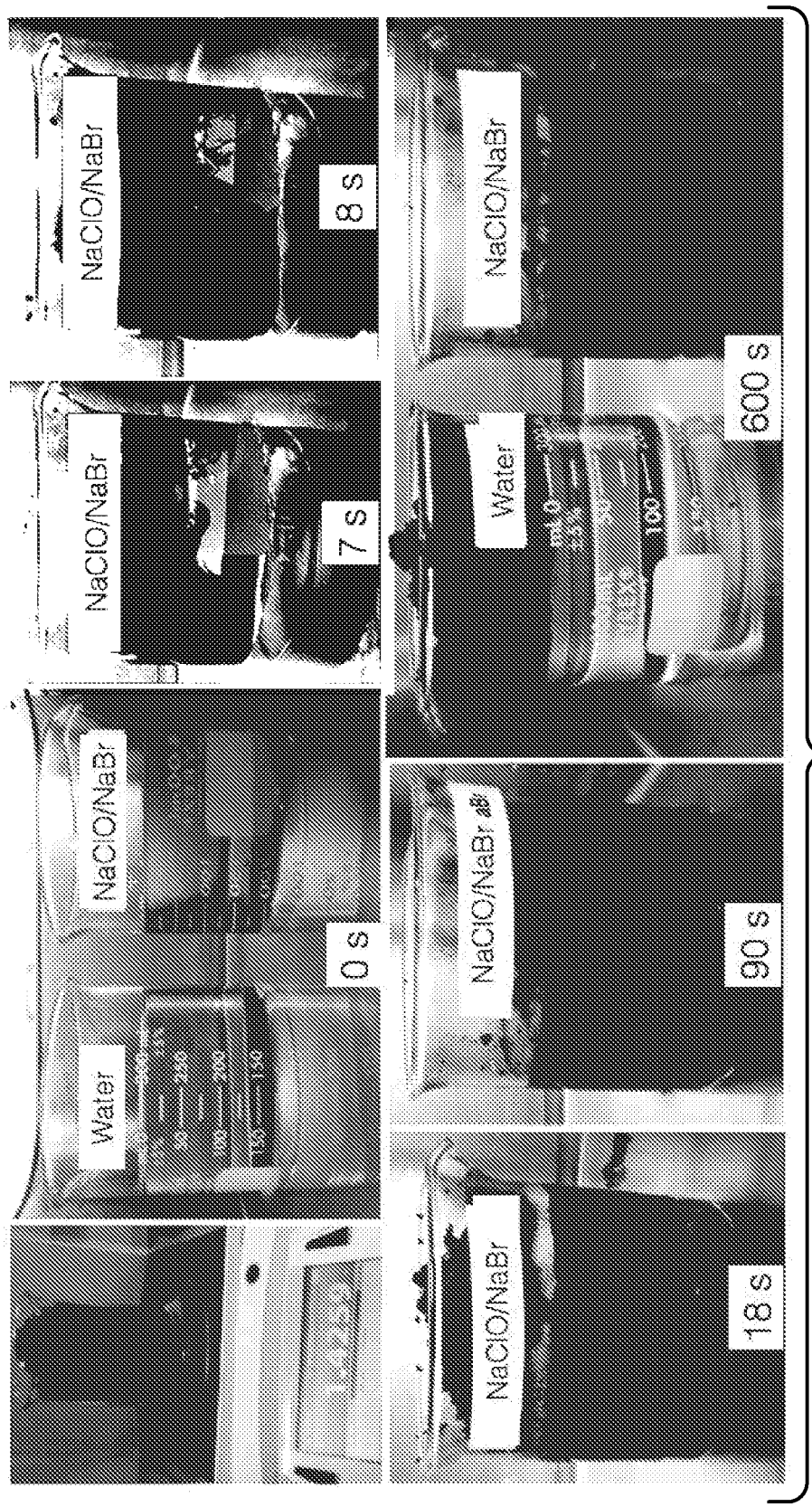
FIG. 9 is images of a dispersion process of GNP powders in a salted solvent containing about 5 wt. % NaClO and NaBr salts with a 5 mg·mL$^{-1}$ concentration of GNPs and showing the powder dispersed within about 600 seconds after being added to the NaClO/NaBr aqueous solvent, according to one or more embodiments of the present disclosure.

Concentrations of up to 5 mg·ml$^{-1}$ of GNP powder were successfully dispersed, as shown in FIG. 9. This concentration was achieved by weighing out about 1.4159 g of fluffy GNP powder and dispersing it into about 300 mL of the NaClO/NaBr-salted aqueous solvent. As a control sample, the same amount of GNP powder was added to about 300 mL of pure water. After about 10 min (about 600 s), the GNP powder had completely dispersed in the salted solvent to yield about a 5 mg·ml$^{-1}$ concentration of colloidal GNP solution. In contrast, GNPs did not disperse in pure water and remained floating on the surface. Experiments in FIG. 9 demonstrate how quickly the GNP powder dispersed.

Figure 10A:
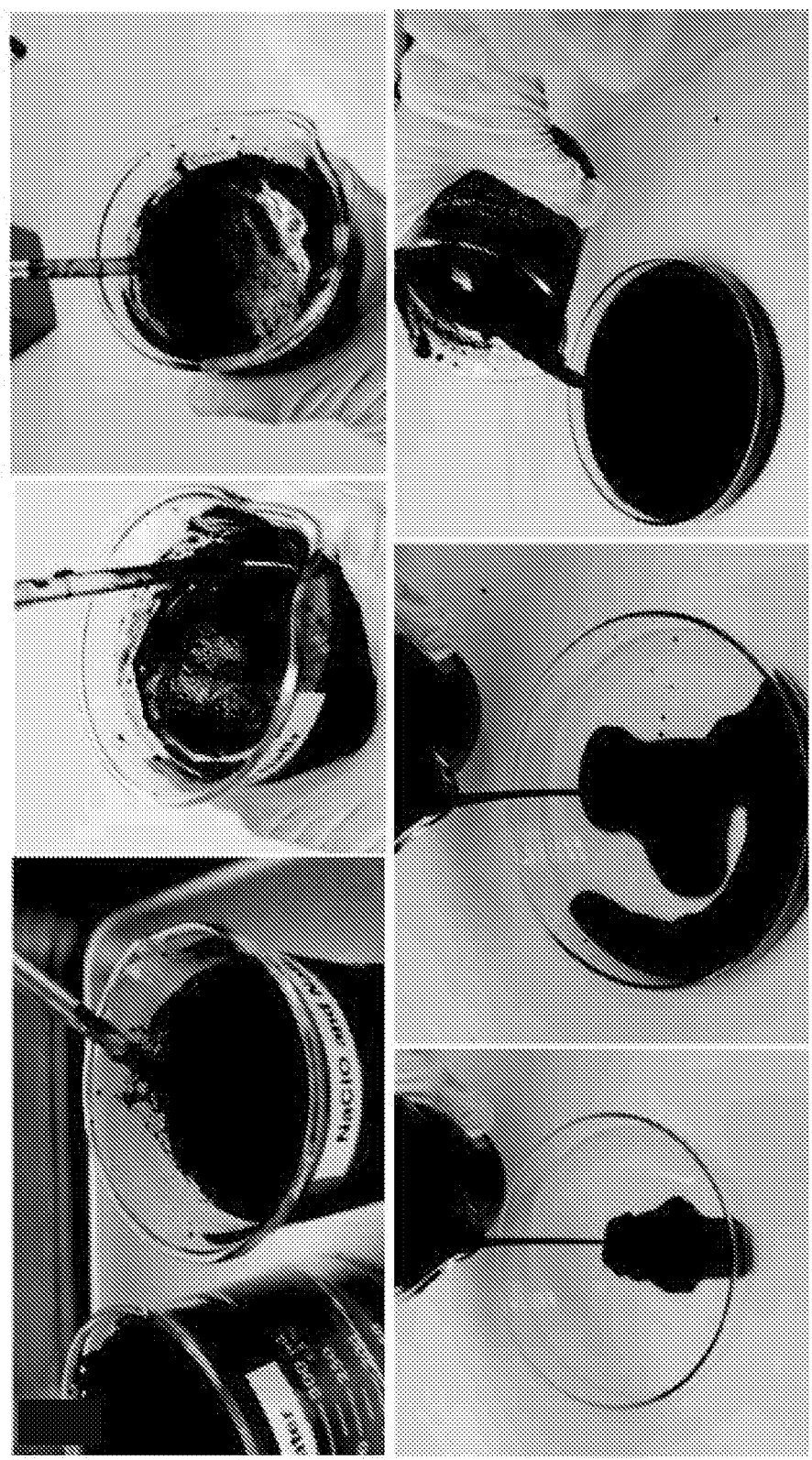
FIGS. 10a-10c are (a) images of a demonstration of a suspension of 5-mg·mL$^{-1}$ concentration of GNPs in NaClO/NaBr solvent with the first image being taken about 10 minutes after adding the GNPs to the salted solution; (b) an image of an aqueous 1-mg·mL$^{-1}$ WSGNP colloidal solution after about a 60 minute dispersion time with the image being take about 10 days after dialysis; and (c) an image of aqueous WSGNP colloidal solutions with concentrations of about 5, 2, 1, and 0.5 mg·mL$^{-1}$ with the images being taken several weeks after the preparation of the solutions, according to one or more embodiments of the present disclosure.
Figures 10B, 10C:
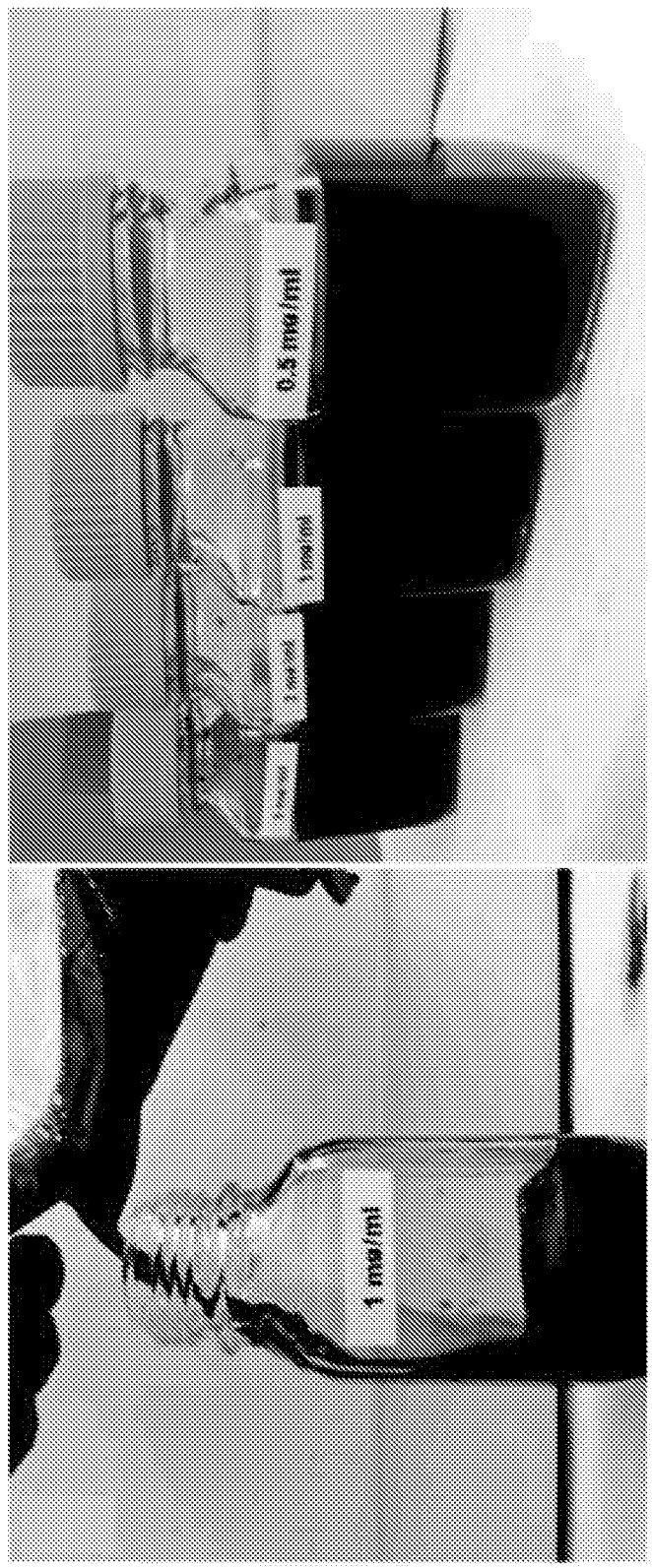

FIG. 10a shows that this high 5-mg·mL$^{-1}$ concentration of GNP colloidal suspension remained in a liquid form, capable of flowing freely. No evidence of a phase separation during the formation of the as-prepared colloidal solution was observed. Two series of samples were prepared: Batch I was prepared to observe how 1-mg·mL$^{-1}$ GNP powder dispersed with time (10, 30, 60, 90, 120, 160 min) and Batch II was prepared to observe how effectively, in 60 min, different concentrations (0.5, 1, 2, 5 mg·mL$^{-1}$) of GNP powder dispersed. After the appropriate dispersal time, all samples were centrifuged at about 5000 rpm for about 5 min to remove all dispersion medium and dialyzed for about 10 d to remove residual chemicals. Water was then added to the purified GNP to re-adjust the concentration to the initial value. FIG. 10b shows washed GNP colloidal solution after about 10 days of dialysis (Batch I, 60 min at 1 mg·mL$^{-1}$). FIG. 10c shows washed GNP suspended in pure water at 5, 2, 1, and 0.5 mg·mL$^{-1}$. As used herein, WSGNP refers to all treated-GNP water-soluble graphene nanoplatelets. Note that the two types of GNP powders purchased, from different companies, for this study had varied purities and defect densities. Non-polar, defect-free single-walled carbon nanotubes (SWNTs) were also successfully dispersed into this salted solution, indicating that this approach has the potential to disperse all graphitic materials.

Figure 11A:
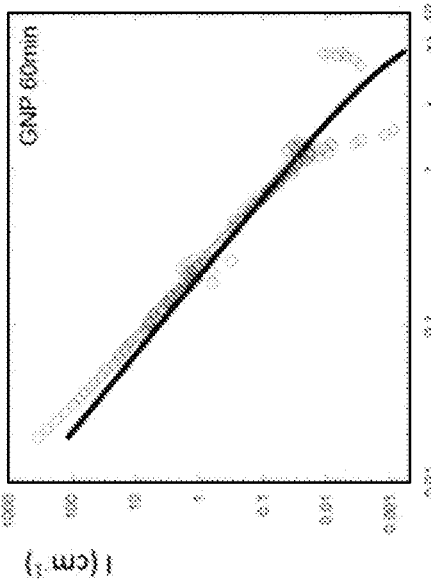
FIGS. 11a-11f are (a) a TEM image of the GNP/water colloidal solution with the inset on left showing an SAED image of GNP powder and inset on right showing a histogram of projected GNP flake sizes based on measuring 200 flakes; (b) variation on the SANS scattering in water as function of time for GNP; (c) modeling of the SANS using a form factor of planar object (full black line) for GNP at 60 min; (d) a TEM image of the WSGNP/water colloidal solution, with the inset showing a histogram of projected flake sizes; (e) variation of the SANS scattering in water as function of time for WSGNP; and (f) modeling of the SANS using a form factor of planar object (full black line) for WSGNP at 60 min, according to one or more embodiments of the present disclosure.

To quantify the improvement in dispersability in aqueous medium after pretreatment, the dispersion status of GNP and WSGNP in water was examined by transmission electron microscopy (TEM) imaging and small-angle neutron scattering (SANS). TEM samples were prepared from GNP/ water and WSGNP/water solutions at about 1 mg·mL$^{-1}$ for about 60 min. A typical selected-area electron diffraction (SAED) pattern for graphitic crystals was initially observed, implying that GNPs were crystalline (FIG. 11a inset). FIG. 11a shows a TEM image of agglomerated GNPs in the GNP/water solution, from this and more images (not shown here), the average size of GNP aggregates were measured to be ca. 12.95±7.57 µm, as shown in the histogram in FIG. 11a inset. In comparison, flakes from the WSGNP/water solution were measured to have an average size of 3.86±1.73 µm (FIG. 11d), as shown by the histogram in FIG. 11d inset. Because the length of the sonication time was the same for both solutions, the smaller size of the WSGNP flakes was likely reflective of the smaller amount of WSGNP that agglomerated due to less interaction between the flakes in the dispersing medium.

Figure 11B:
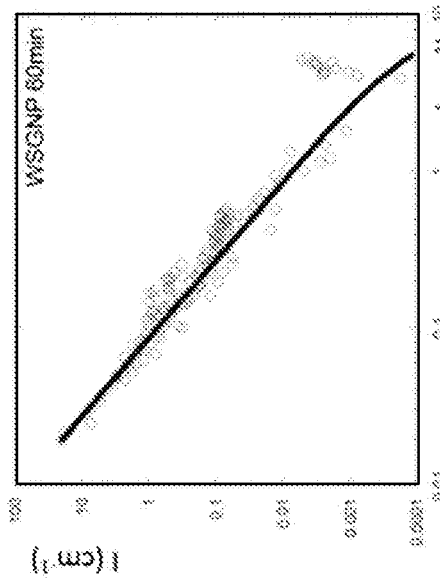
Figure 11C:
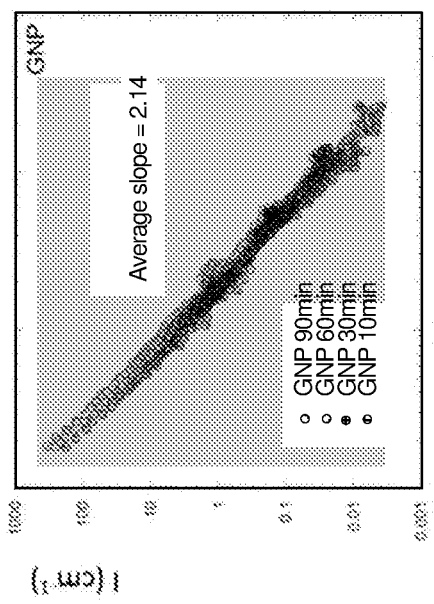
Figure 11D:
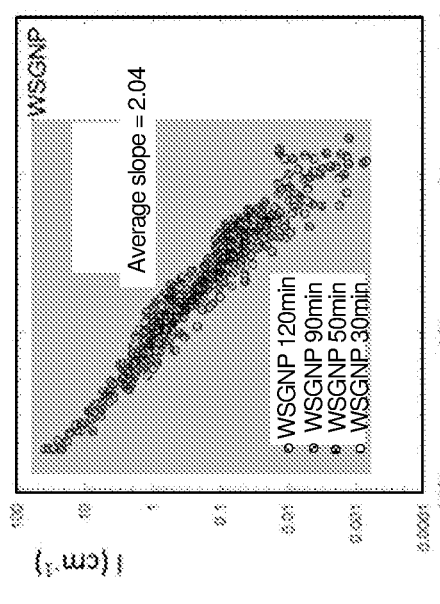
Figure 11E:
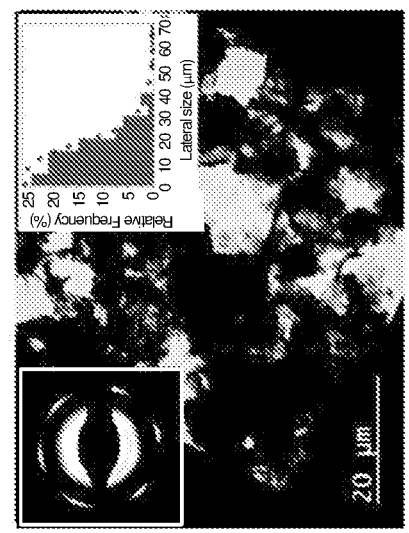

SANS on GNP/water and WSGNP/water colloidal solutions were collected over a q range of $\sim 3\times 10^{-3}$ to 0.4 Å$^{-1}$. The SANS intensity is proportional to a power law regime according to $I(q)=\varphi V \Delta \rho^2 q^{-Df}$, where $\varphi$ and $V$ are the volume fraction and the volume of the objects, $\Delta\rho^2$ is the contrast term relative to the solvent (here water), $q=(4\pi \sin\theta)/\lambda$ is the magnitude of the scattering wave vector and Df is the fractal exponent of the scattering objects. A fractal exponent of fully dispersed plate-like objects is D≈2. FIG. 11b shows that SANS patterns from a GNP/water solution gives an average D value of 2.14, while the patterns of the WSGNP/water solution in FIG. 11e gives an average D value of 2.04. For both cases, the fractal exponent was consistent with the dispersion of 2 dimensional platelets. The absence of plateau at low q indicated that the sizes of the object were larger than the maximum size accessible within the probe q range, typically 200 nm. This was confirmed with the TEM pictures where the size sorting showed micro-size particles. Considering that the particle concentration and the contrast term were similar for both dispersions, the larger level of scattering intensity observed for the GNP/water samples was likely due to the presence of larger volume objects. From the equation of the scattering intensity, the cubic root of the low q intensities between both series—$[250/26]^{1/3}$~2.12 for the 60 min sample—gives directly the ratio between the size of both populations. This value was consistent with the TEM analysis that gives a ratio closer to 2.5=7.5/3 for the maximum of the distribution of the respective sizes.

Figure 11F:
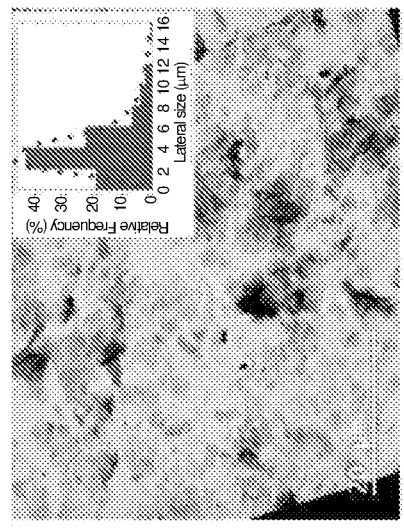

The scattering curve (FIG. 11c GNP and FIG. 11f WSGNP for 60 min) was modeled using a simple form factor of a 2D planar platelet defined by only two parameters: the diameter of the planar objects D and the layer thickness L. The scattering length density for the graphene was calculated considering a density of 2.2 g·cm$^{-3}$·$\rho_C$=7.33×10$^{10}$ cm$^{-2}$ and thus gave a contrast term in normal water ($\rho_{water}$=−0.56×10$^{10}$ cm$^{-2}$) equal to $\Delta\rho$=7.89×10$^{10}$ cm$^{-2}$. For fitting, the diameters of the planar objects were fixed to TEM values, respectively equal to D=7 µm for GNP and D=3 m for WSGNP. As a result, only the volume fraction of scattered objects and the layer thickness were fitted and $\varphi$=0.0225% and L=0.5 nm were found for both samples which were consistent values with sample preparation and monoatomic layer. The main feature of this modeling was that one can observe a very good agreement for the WSGNP sample suggesting a well-defined and well-dispersed organization of the planar objects while the fitting agreement was less for the GNP sample especially at low q suggesting aggregation of the planar objects. From the extrapolation of the intensity when q tends to zero, an aggregation number can be estimated, namely the number of planar object per cluster, which was directly proportional to the ratio between the fitting value and the experimental one: $N_{agg}=I_{0\ exp}/I_{0\ calc}$≈300/100=3. This aggregation observed for the GNP was consistent with the average slope of 2.14 (FIG. 11b) slightly larger than 2.

Figure 12A:
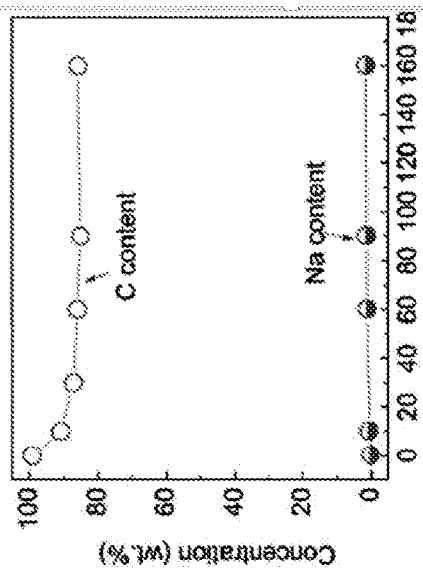
FIGS. 12a-12i are graphical views of (a) solid-state $^{13}$C NMR spectra of WSGNP powder (dispersion time of about 30 minutes and about 160 minutes); (b) C 1s XPS spectra of pure GNP and WSGNP dispersed for about 10, 30, 60, 90, and 160 minutes; (c) carbon and sodium content versus dispersion time in WSGNPs; (d) Raman spectra between about 800 to about 2000 cm$^{-1}$ of WSGNP powders; (e) Raman spectra between about 2200 to about 3500 cm$^{-1}$ of WSGNP powders; (f) dependence of Raman peak location of WSGNP at dispersion time; (g) evolution of FWHM of Raman peaks for WSGNPs against dispersion time; (h) Raman D;G intensity ratio of WSGNP powders; and (i) FT-IR spectrum on a piece of WSGNP film, according to one or more embodiments of the present disclosure.
Figure 12B:
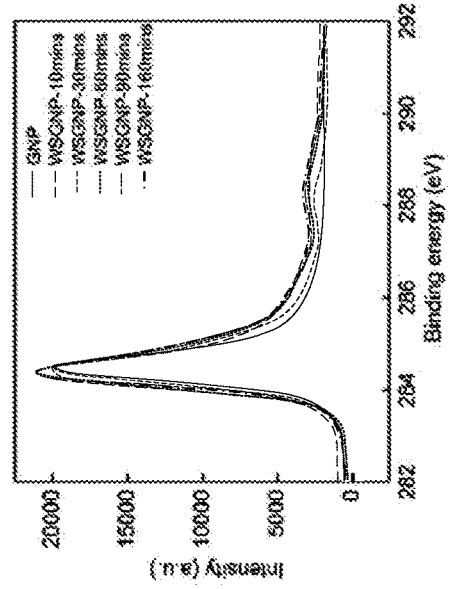
Figure 12C:
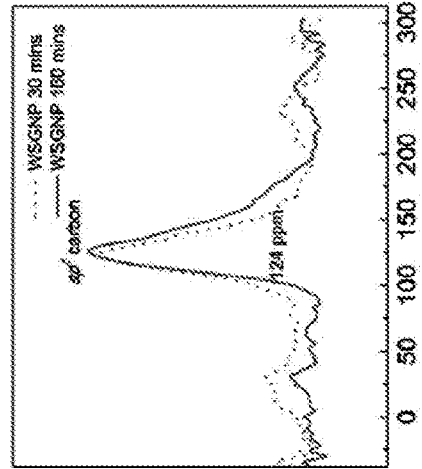
Figure 12D:
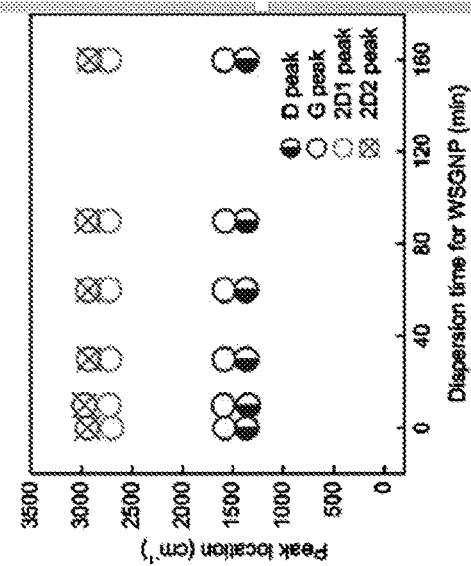
Figure 13:
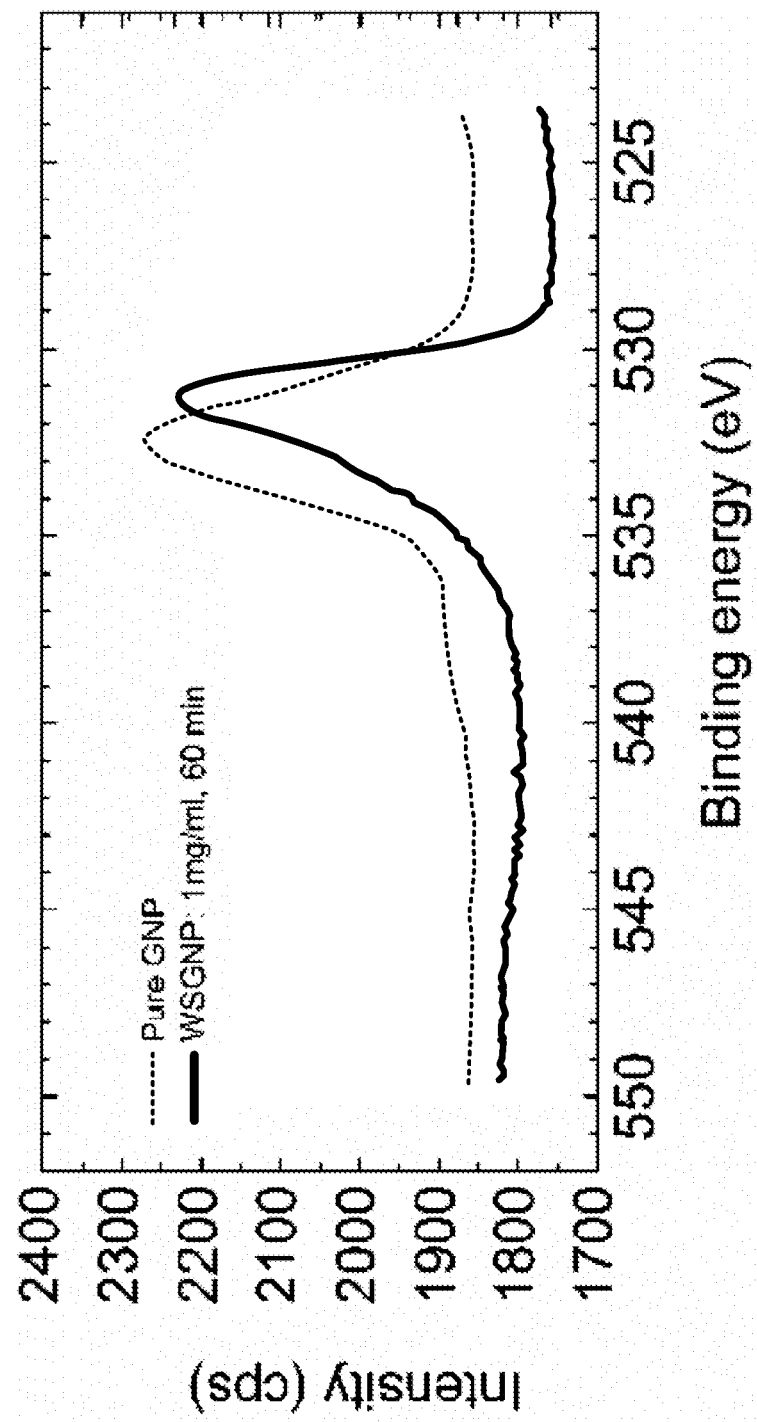
FIG. 13 is a O 1s XPS spectrum of native GNP and WSGNP powders, according to one or more embodiments of the present disclosure.
Figure 14:
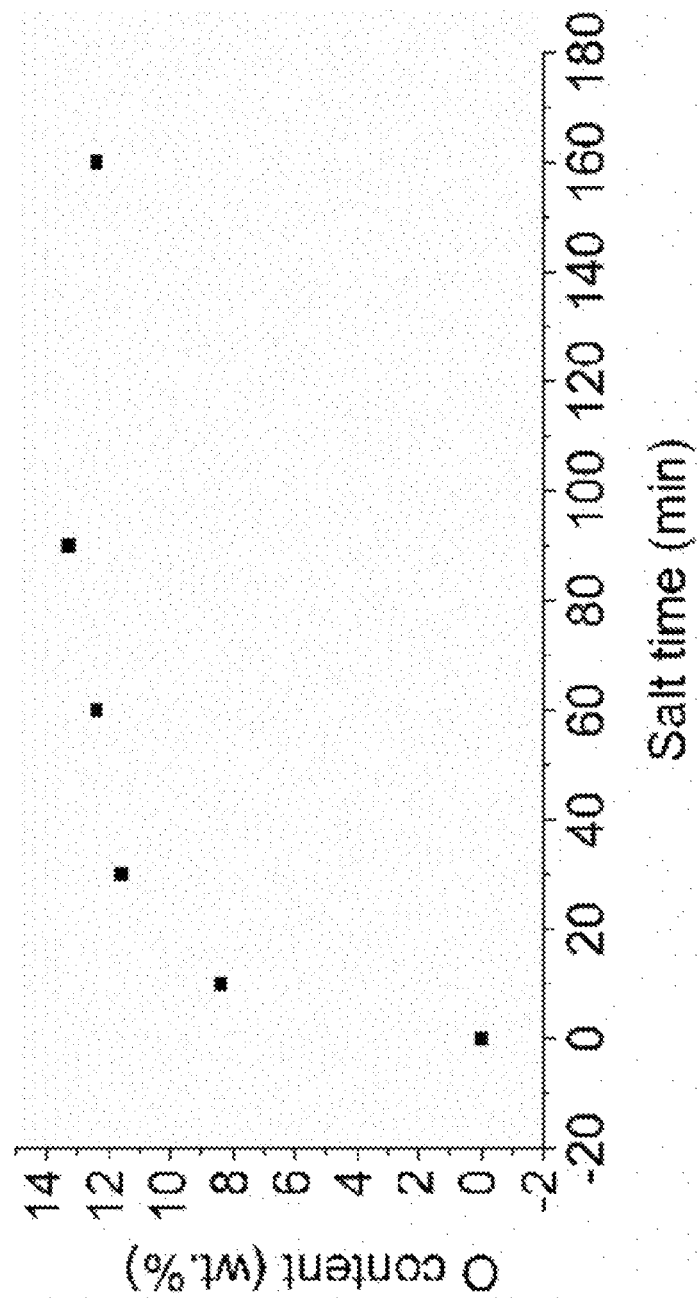
FIG. 14 is a graphical view of oxygen content determined by XPS spectrum of native GNP and WSGNP powders, according to one or more embodiments of the present disclosure.

Solid-state $^{13}$C NMR and XPS measurements were performed on dried WSGNP powders to identify whether the WSGNPs have a "graphene-like" or "graphene-oxide-like" chemical structure. The high resolution spectra of pristine GNP and WSGNP were taken from samples after purification by dialysis. FIG. 12a shows an NMR resonance centered at a chemical shift of 124 ppm, which corresponds to an un-oxidized sp$^2$ carbon (C═C). Graphene oxide typically presents a disrupted sp$^2$-bonded graphitic carbon network. Because only one peak (at 124 ppm) was observed in the spectrum, it was concluded that the WSGNPs have a graphitic structure. The change in the sp$^2$ carbon structure with respect to dispersion time was further verified by XPS (FIG. 12b). Typically, researchers observe a primary C is peak associated with a series of characteristic peaks for C—C (284.8 eV), C—O (286.2 eV), C═O (287.8 eV), and C(O)O (289.0 eV), identifying the oxidation level of graphitic materials. Because there was no pronounced peak at 286 eV, it was concluded that the WSGNP is either un-oxidized or oxidized in very minor proportions with respect to graphene oxide (GO). The O 1s XPS spectra of pristine GNP and WSGNP are shown in FIGS. 13 and 14. The peak location of residual oxygen in the pristine GNP is at 532.4 eV, which was assigned to the surface-adsorbed water and other oxygen species. This peak shifted to 531.2 eV, suggesting that the oxygen types were different. It was believed that the new type of oxygen came from NaClO or that there was a small amount of oxidation in the graphitic structure. The minor peak observed at ca. 288.5 eV may have originated from a small residual amount of salts and/or was similar to that observed in COOH-grafted graphene. Peaks measured for the WSGNP powders were similar to those measured for the original GNP powder, suggesting that the inorganic salts had a benign effect on the graphitic sp$^2$ structure. FIG. 12c plots carbon contents (from XPS measurements) against dispersion time, which shows that carbon content decreased from 100% (pure graphene) to 90% (C:O=9:1). The amount of oxygen induced into WSGNPs was small compared to that induced into GO (C:O=2.1:1-2.9:1) derived from graphite via Hummer's, Brodie's, and Staudenmaier's methods (using HNO$_3$, KClO$_3$, H$_2$SO$_4$, NaNO$_3$, KMnO$_4$, H$_2$O$_2$, HCl). Note that the negligible residual Na$^+$ content (<1 wt. %) in dried WSGNPs (FIG. 12d) was expected to have little to no influence on applications that demand good dispersion.

The quality of the WSGNP was further characterized by Raman spectroscopy, which was a fast and non-destructive method to probe the doping level, strain, disorder, and chemical derivatives of graphitic materials. Unlike single sheets peeled from graphite with perfect honeycomb crystals, commercial GNP samples typically contain defects depending on the production method and may change from sample to sample. Defects in GNPs were introduced through ion bombardment, e-beam irradiation, soft x-ray irradiation, covalent modification, and implantation of substitutional atoms. Defects in GNPs were present when the crystalline order was perturbed without the necessary presence of foreign atoms.

Figure 12E:
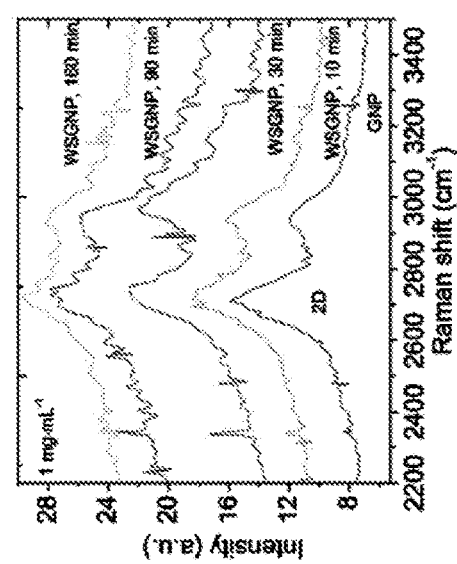
Figure 12F:
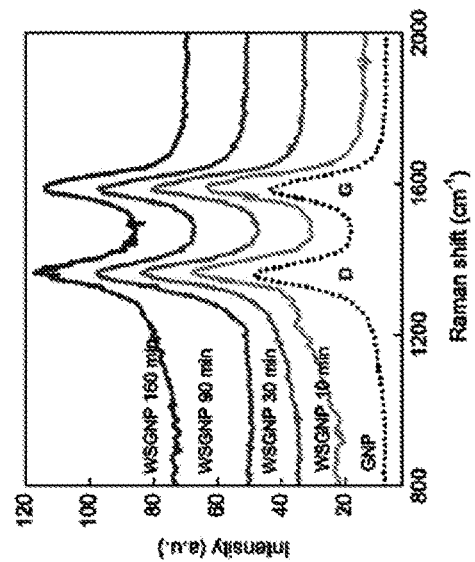
Figure 12I:
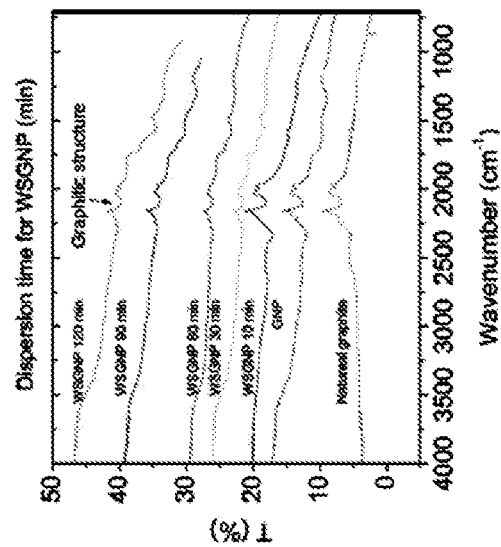
Figure 12H:
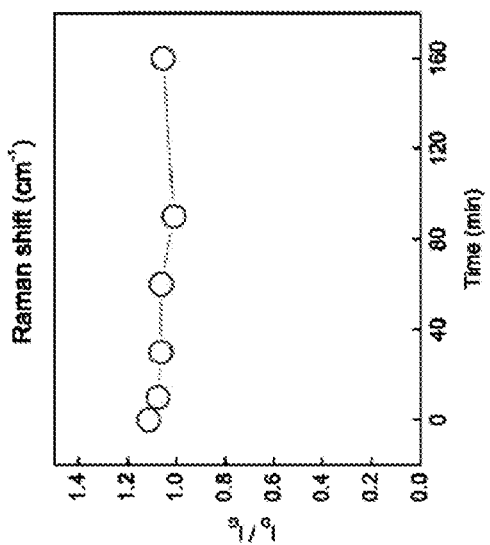
Figure 12G:
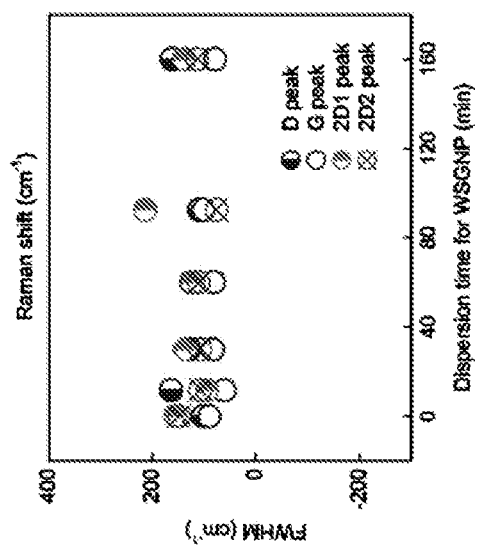

Raman spectra in FIG. 12e present two primary peaks at ~1362 and ~1587 cm$^{-1}$, which correspond to D and G bands, respectively. Two additional peaks at 2717 and 2935 cm$^{-1}$ were also observed and associated with the 2D structure (exfoliated single sheet) (FIG. 12f). A G-band arose from the stretching of the C—C bond in graphitic materials, which was common to all sp² carbon systems. Raman spectrum of defect-free single graphene sheets produced by chemical vapor deposition showed a small D peak and sharp, intense 2D peaks. The D-band reflected the breathing modes of sp² atoms and required a defect for its activation, which was likely introduced during the manufacturing process. FIGS. 12*f-g* shows that there was no obvious change in position, full width at half maximum (FWHM) or intensity of Raman peaks on WSGNPs with varying dispersion times. The peak shape and relative broad FWHM of D and G bands in the Raman data presented in this work were consistent with some degree of basal plane defects. The second-order region of the spectrum also showed large FWHM values, consistent with a defective basal plane; however, not to the extent that was observed in GO. Nevertheless, the intensity ratio of D and G bands that qualified the degree of disorder of various WSGNP powders showed the sample with a ratio similar to that of original GNP, suggesting the salts did not increase the degree of disorder in WSGNPs (FIG. 12*h*). From the spectrum, the material was clearly defective, but there were no changes to the defect over treatment time. The 2 D/G intensity ratios were GNP=0.2578; WSGNP (10 min)=0.2655; (30 min)=0.1597; (60 min)=0.2031; (90 min)=0.1450; (160 min)=0.2308, which showed that these were many-layered materials. Surface charged fully dried WSGNP films were characterized by Fourier transform infrared (FT-IR) measurements (FIG. 12*i*). GNPs had a characteristic peak at ~2100 cm⁻¹ representing its graphitic structure. The origin for the peak at 2100 cm⁻¹ could not be identified since the FT-IR spectrum was largely different from that of highly oxidized graphene materials. It is clear that this peak is not associated with C—OH, C—H, C=O, which is often common for traditional oxidized graphitic materials. This peak originally came with the pristine GNP. It was therefore assumed that it was from the impurities or other defects. Absence of functional groups in purified WSGNPs after 100° C. drying implied that sodium hypochlorite and sodium bromide salts had a little covalent effect on the WSGNPs. Based on all previous results, it was concluded that the proposed treatment did not significantly interfere with the initial graphitic structure of the GNPs.

To better characterize the salted solvent used for treating the GNPs during the first step, there was a closer look at its ionic content. In a NaClO solution, ionic species (Na⁺, OH⁻, and ClO⁻) were present when the system was in equilibrium. (Reac. 1):

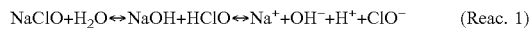

Figure 15B:
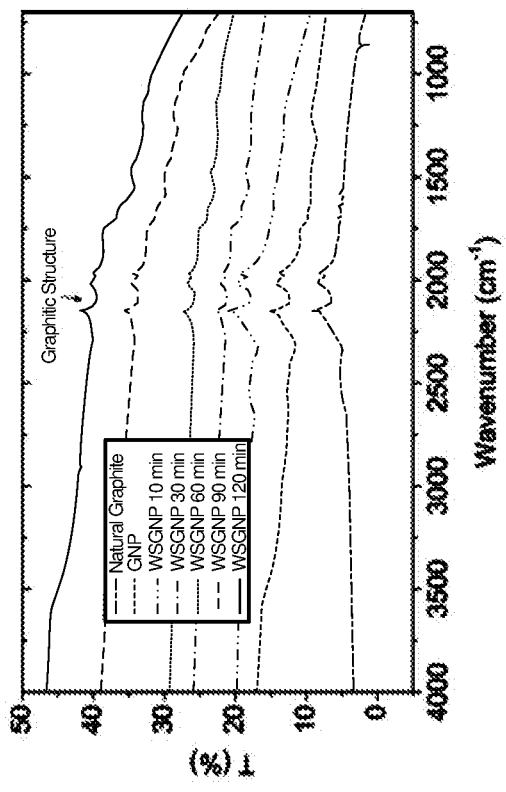
FIGS. 15a-15b are graphical views of (a) ion chromatography of salts and their compounded mixture at about 100 ppb in water and (b) FT-IR spectrum on a piece of WSGNP film, according to one or more embodiments of the present disclosure.
Figure 15A:
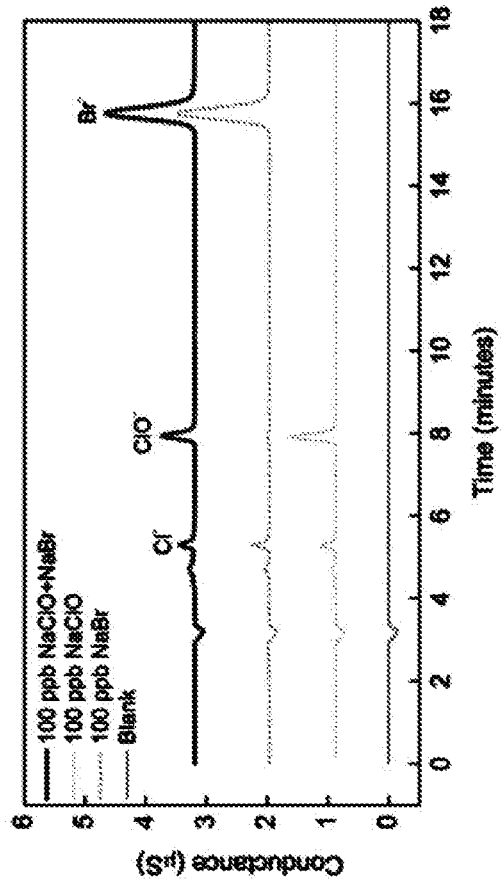

Chloride ions (Cl⁻), hypochlorite (ClO⁻), and bromide ions (Br⁻) were detected in NaClO/NaBr-salted solution through ion chromatography measurements. Addition of sodium bromide into sodium hypochlorite generated no new ionic species (FIG. 15*a*). Surface charged fully dried WSGNP films were characterized by Fourier transform infrared (FT-IR) measurements (FIG. 15*b*). GNPs had a characteristic peak at ~2100 cm⁻¹, representing its graphitic structure. Absence of functional groups in purified WSGNPs after 100° C. drying implied that sodium hypochlorite and sodium bromide salts had a non-covalent effect on the WSGNPs.

The GNP powder blended into a low-concentration of NaClO- and NaBr-salted aqueous solvent very quickly, and the well-washed-WSGNP colloidal solutions continued to maintain their high colloidal stability in water. Dispersion of GNP powder was the result of a mixing process that mainly depended on the change in enthalpy of the mixture ($\Delta H_{mix}$) per unit volume, thickness of the flake ($T_{flake}$) the surface energy ($E_G$) of graphene and of the solvent ($E_{solvent}$), and graphene's volume fraction (φ). The following relationship may provide an estimate:

$$\Delta H_{mix} \approx \frac{2}{T_{flake}}(\sqrt{E_G} - \sqrt{E_{solvent}})^2 \phi \quad (eq.\ 1)$$

Good dispersion required a minimal energy cost (i.e., $\Delta H_{mix} \approx 0$), which suggested that the surface energy of graphene and solvent were expected to be similar. Because nanotube/graphite had been shown to have a typical surface energy of ~70-80 mJ·m⁻², the surface energy of the dispersing medium was expected be in this range. The surface tension (γ) of the solvent was measured and converted into surface energy ($E_{solvent}$) using eq. 2:

$$E_{solvent} = \gamma + TS_{solvent}, \quad (eq.\ 2)$$

where T is the temperature (T=293.55 K) and $S_{solvent}$ is solvent's surface entropy (ca. 0.1 mJ·K⁻¹·m⁻²). Surface tensions for water, NaClO/NaBr, NaClO/water, NaBr/water, and water were experimentally determined as follows: $\gamma_{water}$=70.37±0.01, $\gamma_{NaBr}$=58.74±0.10, $\gamma_{NaClO}$=50.71±0.31 and $\gamma_{NaClO/NaBr}$=38.50±0.09 mN·m⁻¹. These values were then converted to the following respective surface energies ($E_{solvent}$): 99.73, 88.10, 80.06, and 67.85 mN·m⁻¹, respectively. These surface energies were compared with those of several solvents (NMP, 1,3-dimethyl-2-imidazolidinone, benzyl benzoate, γ-Butyrolactone (GBL) and dimethyl sulfoxide) previously identified to be suitable for graphene dispersions (FIG. 16*a*). The parameters [γ, E] of NaClO/NaBr [38.5, 67.9 mJ·m⁻²] were the closest to those of NMP [40.1, 69.5 mJ·m⁻²], which was typically considered to be an excellent solvent for graphene. Note that the values of surface tension presented here were based on 20 repeated measurements to ensure their accuracy. The simple addition of NaBr salt into NaClO considerably lowered surface tension.

WSGNPs suspended in water were further characterized by zeta-potential (ζ) measurements. Electrostatic repulsion between particles depended on the absolute value of the zeta potential: the higher the value, the stronger the repulsion and the more stable the dispersion. The zeta-potential value (FIG. 16*b*) was in a range of |−9.9| mV to |−36.2| mV within 160 min of dispersion time. Based on the negative zeta-potential values, it was concluded that all of the ions absorbed on GNPs were anions carrying negative charges (e.g., Br⁻, OH⁻, and ClO⁻) in the salted solution. This conclusion was supported by experimental evidence that anions were usually selectively enriched in interfacial layers. In particular, behavior of absorbance of ClO⁻ onto graphitic surfaces was thought to be very similar to the behavior of other ionic species dissociated from acids ($PO_2^-$, $SO_3Cl^-$). This non-covalent absorbance on graphitic surfaces of anions generated high Columbic repulsion between particles, resulting in a good dispersion effect for graphitic materials. On top of this anion layer, two types of cations, hydronium ($H_3O^+$, or called H⁺) and sodium (Na⁺), were considered to be on top of the negatively charged ionic layer, neutralizing the system (FIG. 16*c*). The $H_3O^+$ cations came from the ion dissociation of water:

This type of ionic structure had an intense cancelling effect on the breaking of hydrogen bonds in water (the main reason for high surface tension). This reduced surface tension of the NaClO/NaBr/water solution.

The Derjaguin-Landau-Verwey-Overbeek (DLVO) theory was helpful in explaining WSGNP's homogenous status in water and why the WSGNPs were easily re-suspended in pure water after all of the NaClO/NaBr/water solvent was discarded. This theory considered that total potential energy of the particle-particle system was a balance between electrostatic repulsive potential ($V_{DLVO}$) and van der Waals attractive potential $V_{vdW}$ between sheets (eq. 3-4):

$$V \approx 2V_{DLVO} + V_{vdW} \qquad (eq. 3)$$

$$V \approx 4A\varepsilon_r\varepsilon_0\kappa\zeta^2 e^{-\kappa D} - \frac{A\pi\rho^2 C}{2D^4}, \qquad (eq. 4)$$

where A is the area of a single graphene sheet, $\varepsilon_r\varepsilon_0$ is the solvent's permittivity ($\varepsilon_r=80$, $\varepsilon_0=8.85\times10^{-12}$ $C\cdot V^{-1}\cdot m^{-1}$), and the Debye screening length $\kappa^{-1}$ was calculated to be 14.7 nm according to eq. 5:

$$\kappa^{-1} = \left(\frac{\varepsilon K_B T}{e^2 N_A 2C}\right)^{\frac{1}{2}} \qquad (eq. 5)$$

where $\varepsilon=\varepsilon_r\varepsilon_0$; $K_B$ is the Boltzmann constant; T is the measurement temperature at 300 K; e is the elementary charge; NA is Avogadro's number; C is the concentration of sodium ions at $4.349\times10^{-4}$ $mol\cdot L^{-1}$, which was calculated by taking the sodium content in WSGNP (~1 wt. %), the concentration of the WSGNP colloidal solution (1 $mg\cdot ml^{-1}$), and the molar mass of sodium (22.9898 $g\cdot mol^{-1}$); $\zeta$ is the zeta potential (−36.9 mV for WSGNP was used, ~0 mV for GNP); and D is the distance between sheets. Graphene's surface energy density ($\rho^2 C$) was $6.69\times10^{-40}$ $J\cdot m^2$. Total potential energy was converted from $J\cdot m^{-2}$ to milli-electron volt (meV). Using these parameters, the interaction energy per surface area V/A ($meV\cdot nm^2$) was plotted as a function of sheet separation in FIG. 16d; plots of the DLVO and van der Waals components were also included. An upward peak located at D of ca. 20 nm was observed in the curve for $2V_{DLVO}+V_{vdW}$, representing an energy barrier that was believed to result in the stabilization of WSGNP colloids in water.

To demonstrate WSGNP's potential in electrical electronics, dried and flexible freestanding WSGNP films were prepared via vacuum filtration of WSGNP colloidal solutions (FIG. 16e). Note that the WSGNP films were obtained by both compressing/drying in a vacuum oven at 100° C. overnight to remove trapped water between the sheets. As plotted in FIG. 16f, electrical conductivity ($\sigma$) of obtained films was as high as $2.2$–$3.0\times10^3$ $S\cdot m^{-1}$, and the sheet resistance ($R_s$) was also low for several $\Omega\cdot sq^{-1}$ (bulk film thickness ca. 0.039 mm) (FIG. 16f inset). The electrical conductivity was high compared to previous reports; for example, Si et al. (2008) reported prepared water-soluble graphene without oxygen-containing functional groups with a $\sigma$ value of $1.25\times10^3$ $S\cdot m^{-1}$. Graphite-exfoliated and ethanol-dissolved graphene film was measured to have a $\sigma$ value of $1.13\times10^3$ $S\cdot m^{-1}$, and graphene film bonded noncovalently with water-soluble pyrene ($C_{16}H_{10}$) was measured to have a $\sigma$ value of $2\times10^2$ $S\cdot m^{-1}$. Note that electrical conductivity for highly functionalized and highly defected graphene oxide was $6\times10^{-5}$ $S\cdot m^{-1}$. Thus, in comparison to previous results, good electrical conductivity of WSGNP films was achieved, attesting to their broad range of applicability.

Preparation of water-soluble graphene films according to the methods described herein is very competitive. Other solvents (e.g., N-methyl-2-pyrrolidone—NMP, N, N-Dimethylform—DMF, cyclohexanone, o-dichlorobenzene—DCB, N-Cyclohexyl-2-pyrrolidone—CHP, and dichloroethane (DCE), possess high boiling points (NMP about 200° C., cyclohexanone about 155° C., CHP about 154° C.), as well as safety concerns leading to challenge sin printing and processing. This leads to disadvantages for many integration strategies, especially printing, coating, compositing, and exfoliation for which a low boiling point, such as with alcohols and water, is desirable.

In sum, a new dispersion approach for quickly generating water-soluble GNP colloidal solutions while preserving the graphitic $sp^2$ structure was provided. This study systematically investigated the dispersion process, morphology, chemical composition, colloidal stability, and electrical properties of WSGNPs. Concentrations as high as 5 $mg\cdot ml^{-1}$ were achieved and maintained for up to several weeks. No phase separation was observed in salted-GNP aqueous colloidal solutions even after 6 months. In addition, the vacuum-filtrated films obtained from WSGNP colloidal solutions demonstrated excellent electrical conductivity. WSGNPs were obtained by pre-treating GNPs in a salted solvent. The salted solvent presented here exhibited potential for broad interest to the larger community using GNPs and other similar types of graphitic materials. The solvation system will work for high-purity carbon nanotubes (single walled, multi-walled), carbon spheres, graphene nanoribbons, and a variety of other nanomaterials in the carbon family. The only limitation of this dispersion protocol is that a small amount of residual ions may not be suitable for some specific applications. Otherwise, this facile, environmentally friendly and potentially scalable preparation for high-concentration graphene colloidal solutions has excellent potential for many applications.

Example 3

Aggregation is a major problem for hydrophobic carbon nanomaterials such as carbon nanotubes (CNTs) in water because it reduces the effective particle concentration, prevents particles from entering the medium, and leads to unstable electronic device performances when a colloidal solution is used. Molecular ligands such as surfactants can help the particles to disperse, but they tend to degrade the electrical properties of CNTs. Therefore, self-dispersed particles without the need for surfactant are highly desirable. It is reported for the first time in this Example that CNT particles with negatively charged hydrophobic/water interfaces can easily self-disperse themselves in water via pre-treating the nanotubes with a salt solution with a low concentration of sodium hypochlorite (NaClO) and sodium bromide (NaBr). The obtained aqueous CNT suspensions exhibit stable and superior colloidal performances. A series of pH titration experiments confirmed the presence and role of the electrical double layers on the surface of the salted carbon nanotubes and of functional groups and provided an in-depth understanding of the phenomenon.

Experimental Section

Figure 19J:
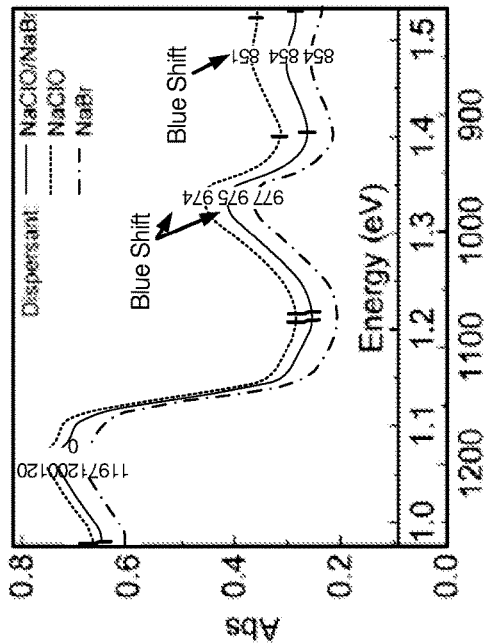
Figure 19L:
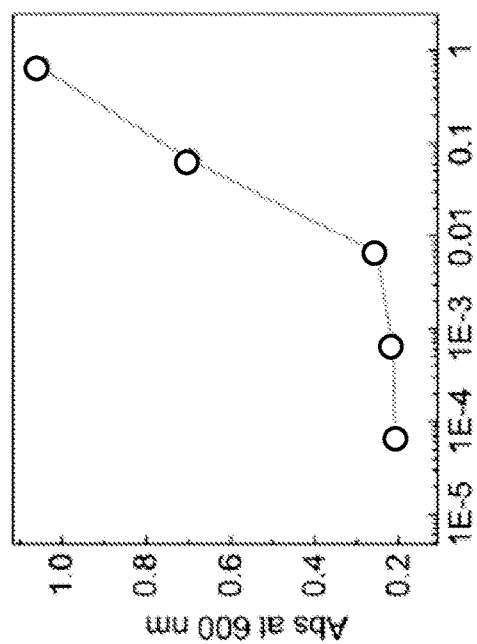
Figure 19I:
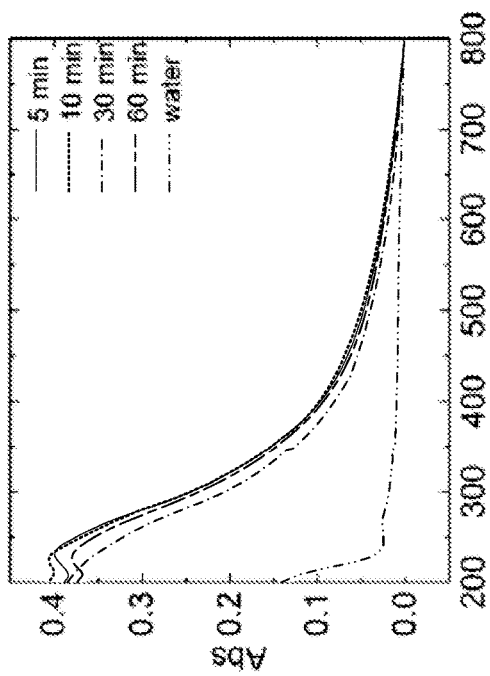
Figure 19K:
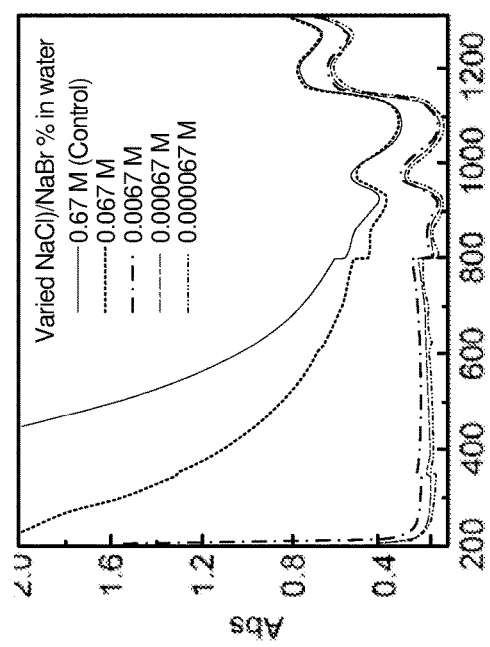

A mixture of nonpolar single- and double-walled carbon nanotubes (SDWNTs) was used in this study. It was purchased from Cheap Tubes Company as prepared by the combustion chemical vapor deposition (CCVD) process. The SDWNTs had outer diameters of 1-4 nm, purity >99 wt %, and an average length of 3-30 min. The 5% sodium hypochlorite solution and sodium bromide powder were purchased from RICCA Chemical Company. 37% pure hydrochloric acid solution and sodium hydroxide pellets were both purchased from Sigma-Aldrich Company. SDWCNT was used throughout the study except the experiments demonstrated in FIG. 19j-l. To confirm the effectiveness of the dispersant, semiconductive CoMoCAT-type single-walled carbon nanotubes (SWCNT) were used for UV-vis-NIR optical measurement (FIG. 19j-l). The SWCNT (Product #773735) was purchased from Sigma-Aldrich with a (6,5) chirality, >95% carbon basis, and 0.78 nm average diameter. To disperse the SDWNTs, a mixture of 0.064 g of SDWNTs, 30 mL of aqueous NaClO solution, and 2.073 g of NaBr was prepared and the mixture was sonicated in a regular bath solicitor for 60 min. Then, all the supernatant was removed by using a centrifuge operated at 4000 rpm for 2 min, leaving behind SDWNT slurry, to which 30 mL of pure water was added. Afterward, the resulting salted-SDWNT slurry was sealed in a bag made of Spectra/Por1 dialysis membrane (64 mm tubing diameter and 6-8 kDa pore width) to reduce residual chemicals. The dialysis bag was immersed in 5000 mL of deionized water. Purification completed after changing the 5000 mL water every 12 h for 10 days. The concentration of the purified salted-SDWNT aqueous colloidal solution was adjusted to its original value (2 mg mL$^{-1}$). To adjust the pH of various suspensions, 0.01 M HCl or NaOH aqueous solution was added to the salted-SDWNT or neat-SDWNT colloidal solution. Vacuum filtration to obtain free-standing salted-SDWNT films was performed using a 47 mm diameter vacuum filter assembly (Wheaton Company). The filter used was made of 47 mm diameter polycarbonate (PC) film with 0.05 μm pores (Whatman Company). After filtration, the salted-SDWNT films were then dried in a vacuum oven for 12 h at 100° C., which were used for FTIR and Raman spectroscopy measurements. Scanning electron microscopy (SEM) was performed using a Quanta 3D (FEI Company). TEM images were taken using a Tecnai Twin microscope (FEI). FTIR measurements were taken on Thermo Scientific equipment coupled with a diamond smart accessory and measured on salted-SDWNT films or neat-SDWNT powders. The Raman spectra were recorded using a Horiba/Jovin Yvon Lab Ram system equipped with a 473 nm laser light source. Laser light scattering particle sizing on aqueous solutions of SDWNTs was done with a Malvern Zetasizer Nano system. Measurements for ζ-potential of various CNT colloidal solutions were performed on the same equipment with irradiation from a 633 nm He—Ne laser. Thermogravimetric analysis (TGA) was scanned by a NETZSCH TG, 208 F1 machine from 27 to 880° C. at 20 K/min under a nitrogen atmosphere protection. X-ray photoelectron spectroscopy (XPS) was done in a Kratos Axis Ultra DLD spectrometer equipped with a monochromatic Al Kα X-ray source (hv=1486.6 eV) operating at 150 W, a multichannel plate, and delay line detector under a vacuum of ~10-9 mbar. All spectra were recorded using an aperture slot of 300 μm×700 μm. Survey spectra were collected using a pass energy of 160 eV and a step size of 1 eV. A pass energy of 20 eV and a step size of 0.1 eV were used for the high-resolution spectra. Samples were mounted in floating mode in order to avoid differential charging. Charge neutralization was required for all samples. Binding energies were referenced to the sp$^2$-hybridized (C=C) carbon for the C is peak set at 284.5 eV from carbon nanomaterials. Ultraviolet-visible (UV-vis) spectroscopy measurements were measured by a Cary100 ConC.

Results and Discussion

CNTs are highly important materials with many applications. However, one of the most difficult challenges associated with CNTs is their solubility because individual nanotubes naturally stack themselves into "ropes" due to van der Waals forces. Thus, to fully exploit their nanoscale functions, it is especially critical to solubilize carbon nanotubes appropriately. Solubilization can be realized by functionalizing the surface of the carbon nanotube covalently or by noncovalent interactions with a proper medium. Covalent functionalization involves the use of chemical techniques, such as refluxing and sonication for a long time. For example, CNT's carboxylation typically requires an inefficient and time-consuming process of reflux in concentrated nitric acid for 10-50 h. Solubilization of CNTs in common solvents such as N-methyl-2-pyrrolidone (NMP) and N,N-dimethylformamide (DMF) works as well, owing to a match of surface free energy (68 mJ·m$^{-2}$) between the CNTs and the dispersant. Noncovalent approaches include the use of dispersants such as anionic, cationic, and nonionic surfactants to wrap the nanotubes for efficient dispersion in water. Ionized CNT surfaces that help individualizing/dispersing/stabilizing CNT in solutions are also attracting certain attention. However, studies mentioned above show that using covalent functionalization or a surfactant deteriorates the electrical properties of the final product, either because of the degradation of the CNT structure or by the introduction of an insulating interface around the CNTs. Thus, improving efficiency in solubilizing CNTs in water via a less destructive approach with a high time efficiency would be considered a significant step toward fully exploring the unique properties and broadening the applications of CNTs. Aiming for this, a strategy to achieve excellent dispersibility of CNTs without compromising their microstructure is described herein. In this Example, CNTs were dispersed in sodium hypochlorite (NaClO) conjugated with sodium bromide (NaBr) aqueous solution. Then, treated CNTs were dispersed in water again to obtain CNT aqueous colloidal solutions. The colloidal properties were also characterized to understand the dispersibility.

Figures 17A, 17B:
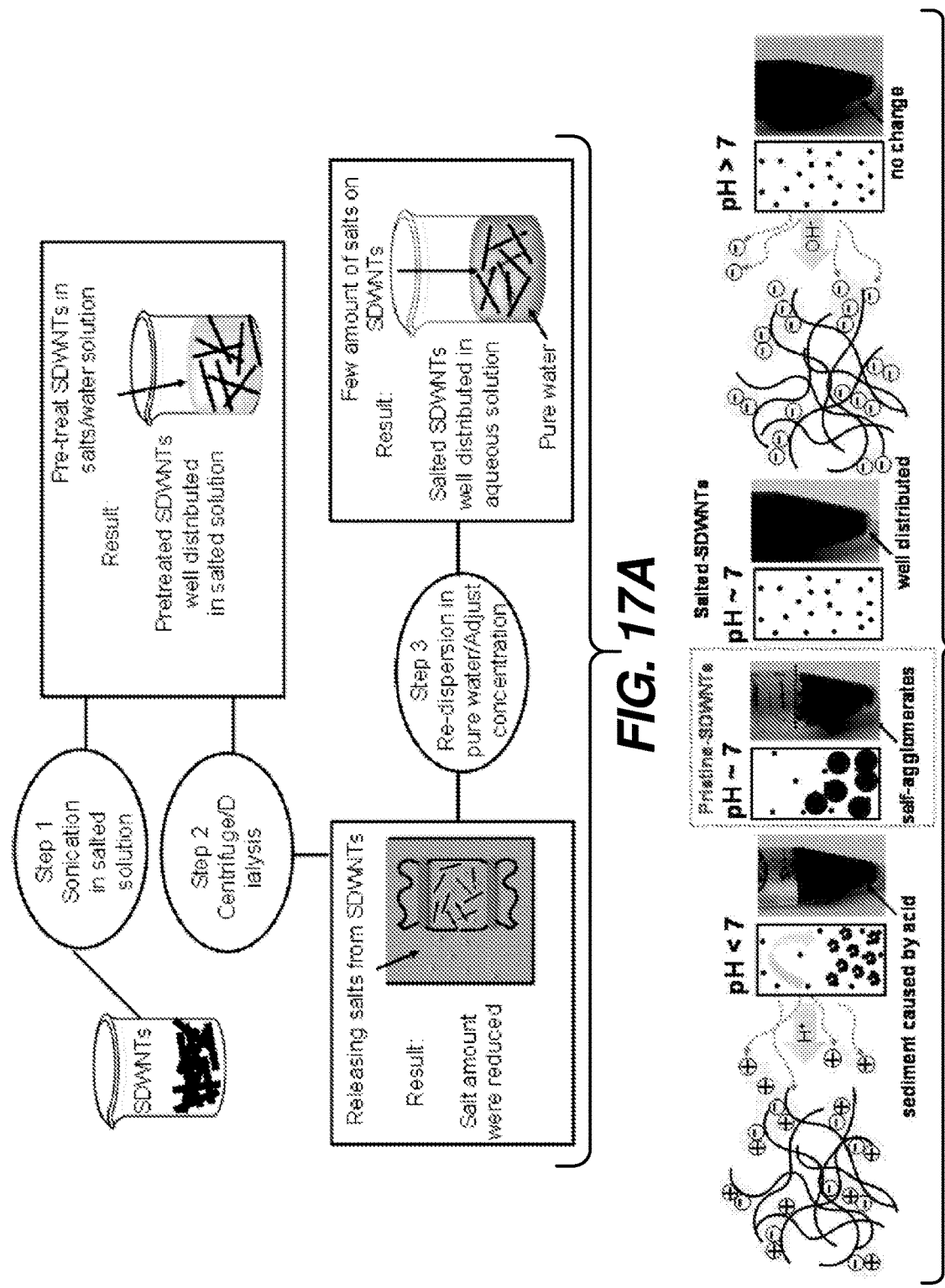
FIGS. 17a-17b are (a) schematic diagrams of an approach to pretreat SDWNTs, wherein the SDWNTs were dispersed in a salted solution followed by purification and dispersion of the salted-SDWNTs in fresh water to obtain a highly concentrated CNT colloidal solution; and (b) scheme of pH titration experiments to study surface charges on salted-SDWNTs, according to one or more embodiments of the present disclosure.

FIG. 17a shows that by using regular bath sonication for 60 min in low-concentration dispersants of NaClO and NaBr, high concentration up to 2 mg mL$^{-1}$ aqueous colloidal solutions with single- and double-walled carbon nanotubes (SDWNTs) can be achieved. First, one of the dispersants, NaClO, was dissolved in the aqueous solution at 5 wt %. NaBr powder was then added at a molar ratio of 1 to 1 with respect to NaClO. FIG. 17b shows the pH titration experiment results on obtained salted-SDWNTs, which will be used later to understand the underlying phenomenology.

Figure 18:
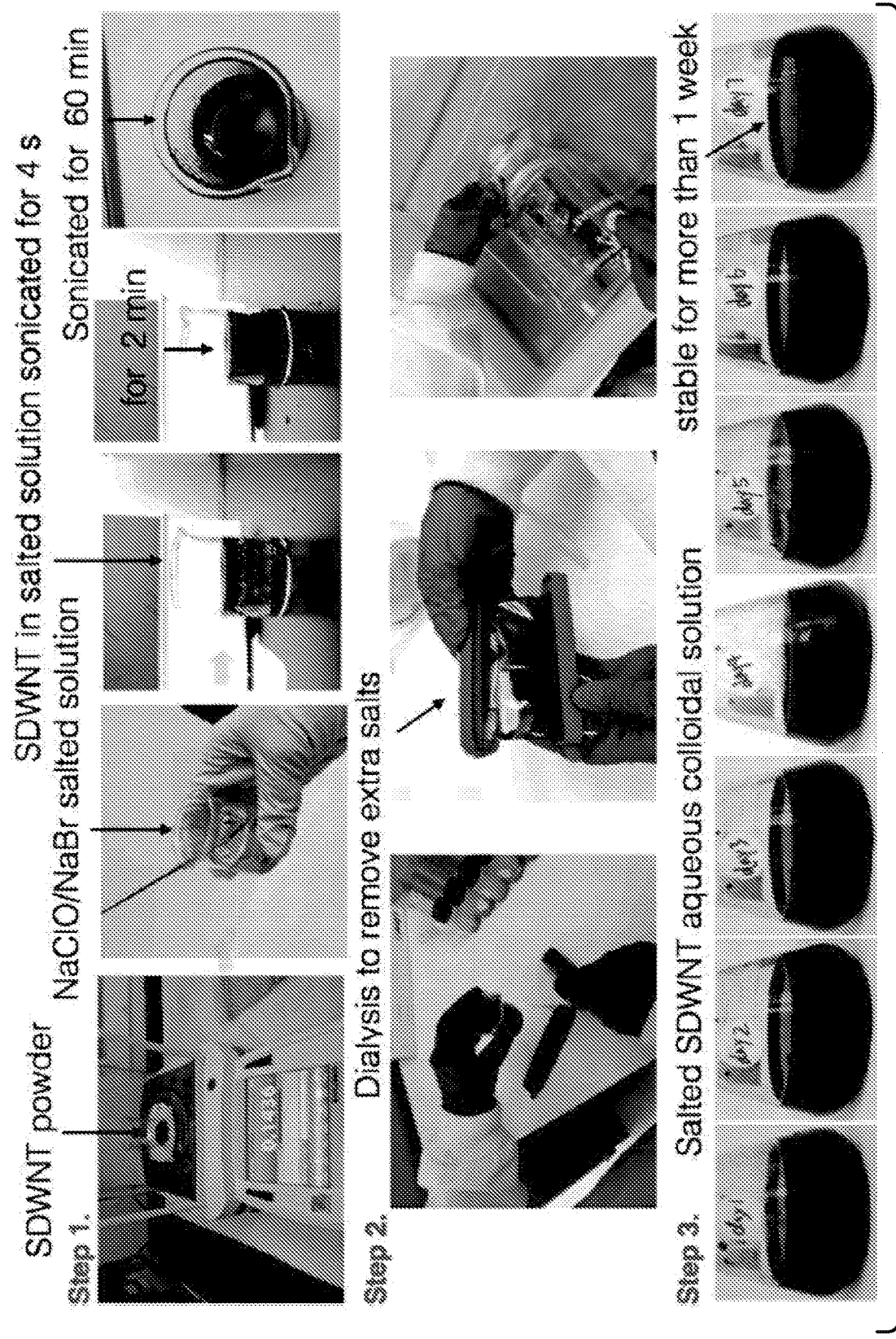
FIG. 18 illustrates preparation of salted-SDWNT aqueous colloidal solution at 2 mg mL$^{-1}$: Step 1: dispersion process of dissolving SDWNT powder into NaClO/NaBr salted solution at 2 mg mL$^{-1}$ SDWNT concentration, by using bath sonication for 60 min; Step 2: the purification process of removing NaClO/NaBr solution from dispersed SDWNTs slurry by dialysis; and Step 3: demonstration of colloidal stability of the salted-SDWNT aqueous colloidal solution at 2 mg mL$^{-1}$, with photos taken every day for 1 week, according to one or more embodiments of the present disclosure.

FIG. 18 shows more details about the preparation of salted-SDWNTs. During the mixing step, a solubilization of the vast majority of SDWNTs in solution within 2 min was observed. After 60 min, the SDWNTs appeared well suspended in the NaClO/NaBr salted solutions. Then, the salted solution with dissolved SDWNTs was purified (step 2). This process included dispersant removal by centrifuge to extract SDWNT slurry. The SDWNT slurry together with additional fresh water was then sealed in a dialysis bag, which was immersed in a container filled with a large volume of deionized water, to remove the majority of NaClO/NaBr chemicals. The dialysis took 10 days by changing the dialysis water twice a day. Finally, we adjusted the purified salted SDWNTs to the initial concentration of 2 mg mL$^{-1}$. As shown in step 3, the salted-SDWNTs remained stable for a week without phase separation or the formation of aggregates, implying that the salted-SDWNTs dispersed well in the aqueous solution.

Next, the salted-SDWNT aqueous colloidal solution was diluted from 2 to 0.01 mg mL$^{-1}$ (FIGS. 19a-19h) to see its homogeneity. For this, 5 mL of the salted-SDWNT colloidal solution was dropped into 1000 mL of fresh water. A spontaneous diffusion completed in approximately 205 s, until a homogeneous SDWNT dispersion was observed. A similar phenomenon for the diffusion of CNTs in water was also reported, but it only became possible by pretreating SDWNTs in oleum (>100% fuming sulfuric acid), which caused an expansion of the tube-tube distance between CNTs. Very likely, the salted-SDWNTs described herein have been modified, which overcomes the van der Waals force attraction that tends to attract SDWNT particles. This modification ensures the free Brownian motion of the salted-SDWNT particles in water. Good dispersion status of salted-SDWNT in pure water was verified by UV-vis absorption measurement on various diluted suspensions (FIG. 19i). All salted-SDWNT suspensions with different treatment time ranging from 5 to 60 min showed high absorption, suggesting the content of particles in solution was higher than unmodified SDWNT suspended in water, which was believed to be ascribed to a highly individualized dispersion state of SDWNTs.

To clarify the effect of the salts on the dispersion of the carbon nanotubes, two experiments were performed. First, the optical transition (S11, S22, etc.) was measured by UV-vis-NIR on another type of tube with small diameter (FIG. 19j). In FIG. 19j, after disintegration, the blue-shift of peaks of SWNTs is observed, which behaved similarly to surfactant-dispersed ones. Second, the quality of the dispersion of the small diameter CNTs upon different amounts of NaClO/NaBr addition (FIG. 19k,l) was measured. Different absorbance at all wavelengths (FIG. 19k,l) was observed when changing the concentration of NaClO/NaBr. Obviously, the concentration of NaClO/NaBr influenced the dispersion of carbon nanotubes in water for two reasons: (1) NaClO/NaBr are physically "soaked up" by tubes; the more NaClO/NaBr cations or anions in water, the longer the tube-tube distance was by the effect of intercalation. (2) The higher light absorbance could be caused by a stronger oxidizing effect (mainly ClO$^-$). However, it seemed that the diluted salt solution did not disperse the SDWNT well; see the 0.0067, 0.00067, and 0.000067 M samples in FIG. 19l. There should be a critical amount of ions (threshold at 0.0067 M) surrounding the tubes for it to overcome the high surface energy of water and to be fully suspended in water.

Figure 20C:
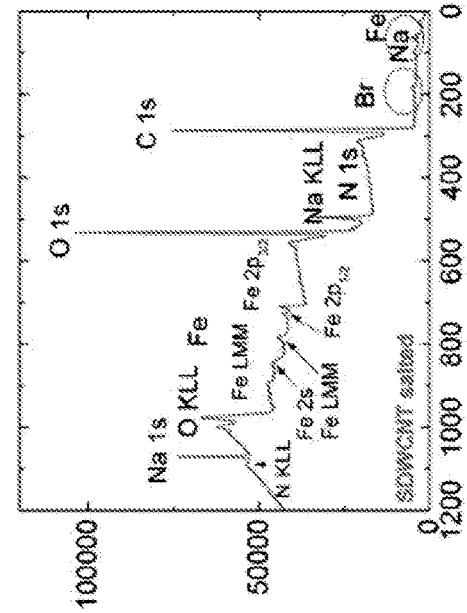
FIGS. 20a-20h illustrate (a) AFM and (b) TEM images of salted-SDWNT particles; (c) XPS full spectra of salted-SDWNT showing absorption of additional ions; (d) XPS C is spectrum on salted-SDWNT showing a relatively small amount of oxidation, compared to H$_2$SO$_4$/KMnO$_4$ oxidized MWCNTs (see inset, where the curves in the inset represented XPS carbon is spectra of oxidized nanoribbons from MWCNTs (dashed) and the reduced nanoribbons (solid)); (e) SEM image and EDS (inset) of salted-SDWNT showing undamaged tube length; (f) TGA curves of pure-SDWNT and salted-SDWNT comparing their thermal stability; (g) FT-IR spectra of salted-SDWNTs compared with pure SDWNTs; (h) Raman spectra of original SDWNT, original SDWNT after sonication, and purified salted-SDWNT film after treatment, according to one or more embodiments of the present disclosure.
Figure 20B:
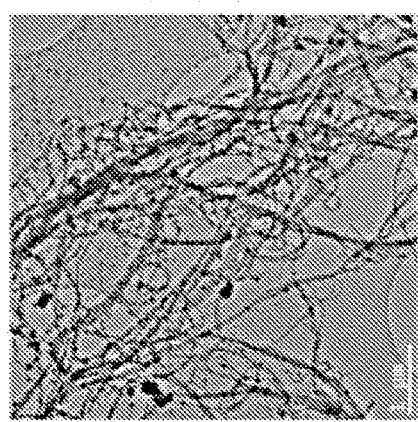
Figure 20A:
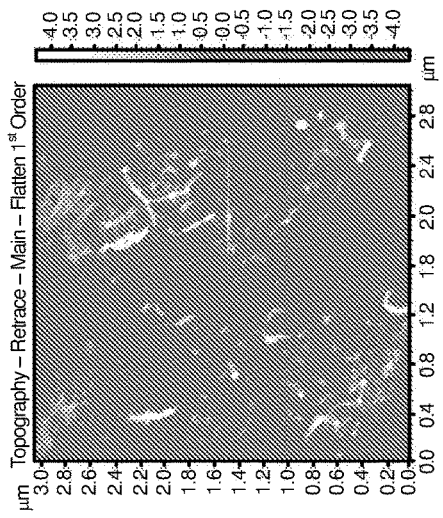
Figure 20F:
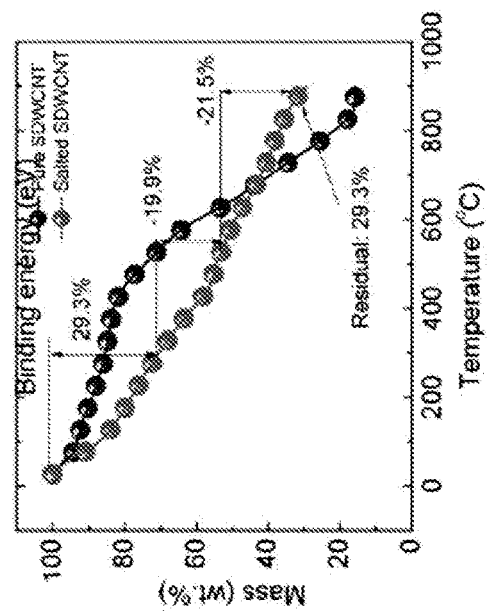
Figure 20E:
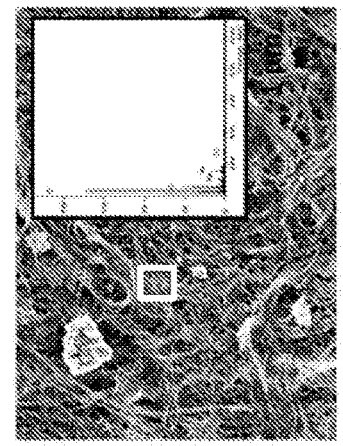
Figure 20D:
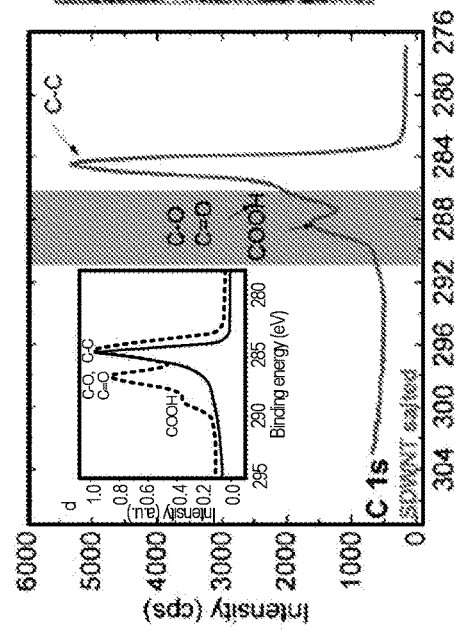

No severe structural damage or morphology change in the salted-SDWNT was observed. Both AFM and TEM imaging (FIGS. 4a,b) proved SDWNT morphology had not been modified by the salt treatment. This was likely either because the combination of NaClO (5%) and NaBr decreased the oxidation capability of ClO— or because NaBr protected the SDWNT. In one report, adequate sodium hypochlorite concentration for preoxidization of multi-walled carbon nanotubes showed that 7% NaClO treatment caused damage to MWNT in 30 min. In particular, it was explained that an excess dosage could destroy the CNT structure. Here, low dosage did not induce any change to the CNTs structure. Moreover, even if an occurred slight oxidation of the nanotubes can be seen in the deconvolution of the C is spectra (FIG. 20d, COOH and C=O bonds), this was negligible if compared to the one induced by strong acids such as $H_2SO_4$. The SEM/EDS provided evidence that the salt layer was still there and was not leached out during the cycles of dialysis. EDS data showed that Na and Br weighted 3.5% and 6.4%, respectively, which attested to the presence of a salt layer in the salted-SDWNT (FIG. 20e, inset).

The SDWNT dispersibility was retained even after the dialysis, suggesting SDWNTs may have charged groups provided by the oxidation using NaClO. Nevertheless, according to the experimental evidence, the salt layer (including either NaBr or NaClO or a conjugation) should also be present during the dispersion and after dialysis, as proved by X-ray photoelectron spectroscopy spectra which showed the presence of Na, Br, and O (FIG. 20c). In the TGA curve, a burnout below 100° C. for pure-SDWNT powder was due to the evaporation of the moisture absorbed from the environment. The mass loss of salted-SDWCNTs at around 350° C. was attributed to the removal of the groups created on the nanotubes after the slight oxidation. The presence of absorbed salts was discerned from the higher mass percentage left after heating up to 900° C. in salt-treated SDWCNTs (29.3%) as compared to pristine-SDWCNTs (less than 20%) (FIG. 20f).

One important thing to be mentioned is that after treating the nanotubes in a solution with such a high molar ratio of salts (the molarity of the salted solution is equal to 1.34 M), no noticeable attenuation of dispersibility was seen after the attempt to remove the ClO— ions from surface of the nanotubes, as proved from both the dialysis cycle and the dilution shown in FIGS. 19a-19h. Therefore, it was postulated that the removal of ClO— was difficult. The reason why the ClO— affinity to the SDWNTs was so high can be linked to the interactions existing between the SDWNTs (electron donor) and ClO— ions (electron acceptor) as postulated in a previous study. In that study, SWNTs were adsorbed to a small molecule (electron acceptor: o-nitrotoluene carrying =O and O—), and this changed the solubilization of SWNTs because the energy of interaction of the as-created complex was larger than the forces of π-π stacking, which in turn made the repulsion between nanotubes larger than the tube-tube attraction. There are some similarities between that study and the present Example, as the electron-acceptor moieties of the salt system described herein are being used to induce a noncovalent functionalization of SDWNTs which, combined with the slight oxidation of the tubes, allowed their efficient and stable dispersion.

FT-IR (FIG. 20g) measurements proved that the salt-treated SDWNTs (used powders were believed not reduced after drying at 100° C. for overnight) experienced a certain degree of covalent surface modification with the attachment of carboxylic groups. In fact, a small new absorbance band was discerned due to COOH stretching (approximately 3300 cm$^{-1}$) and various peaks attributed to the presence of COO— in the range between 2000 and 1500 cm$^{-1}$.

Figures 20G, 20H:
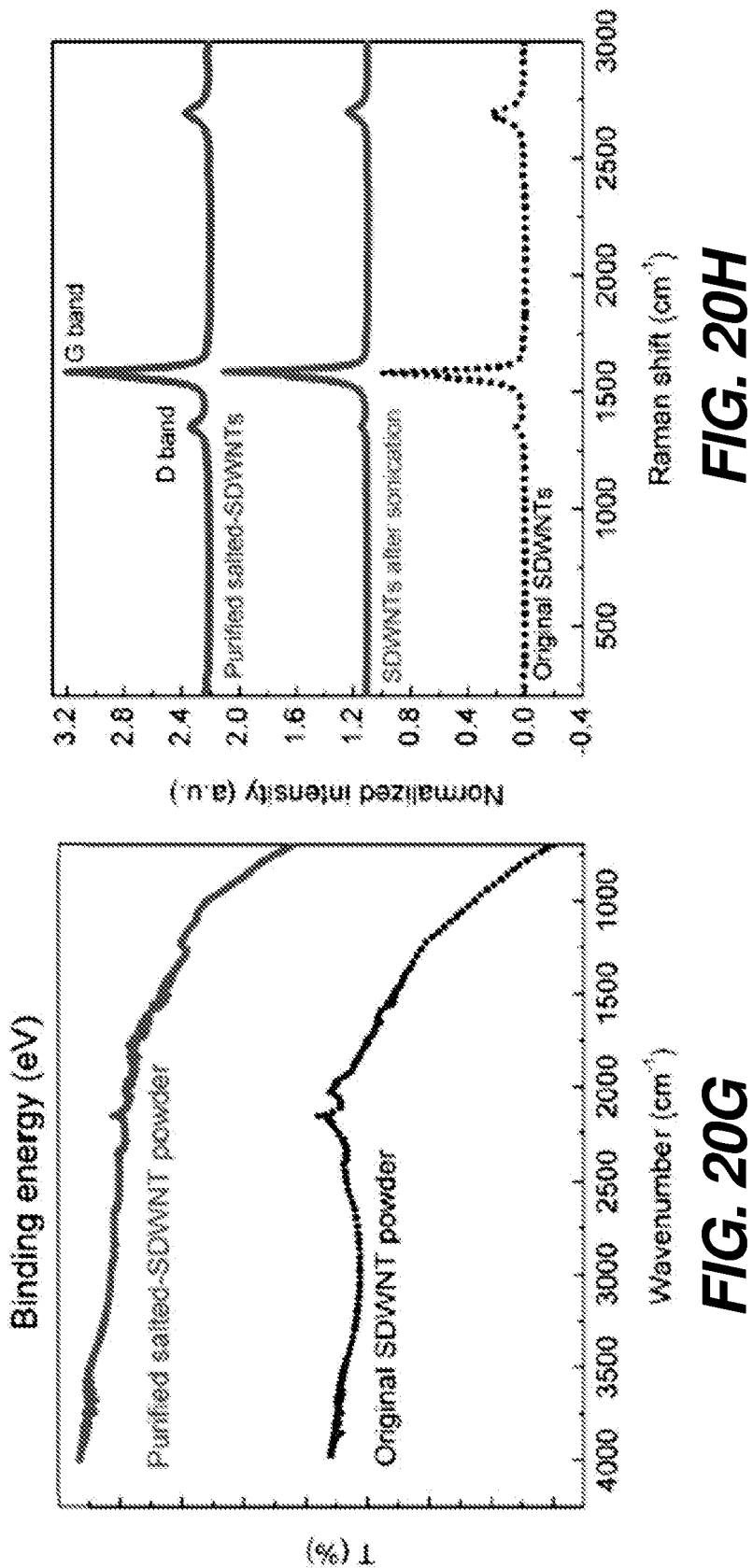

Raman spectroscopy provides a semiquantitative measure of the degree of nanotube destruction by the relative size of the D band (disordered carbon) and the G band (graphite). Three Raman spectra including the neat-SDWNTs, the SDWNTs after only sonication, and the salted-SDWNTs after purification and drying are shown in FIG. 20h. First, the D band appeared almost flat at sonication, suggesting the starting material SDWNTs have a high crystallographic structure. Its intensity increased with salt treatment, implying that the salted treatment caused a certain degree of modification on the nanotubes. Note that this change in the D-band intensity was probably reinforced by an intercalation of salts into SDWNTs, which changed their graphitic perfection. In order to explain why the salted-SDWNTs easily mixed in water, the role of the electrolytes was determined.

A series of pH titration experiments were performed on these solutions to probe the electrical double layers (EDL) of the salted SDWNTs, and photos of CNT agglomerations upon pH titration are shown in FIG. 17c; the experimental results on EDL are plotted in FIGS. 21a-21e. As sketched in FIG. 21c, stabilization of colloidal solutions was believed to be ascribed to oxidation and the electrostatic repulsion between colloidal particles caused by an EDL, originating from either ion enrichment or introduced by chemical bonding (yellow marked layer indicates chemical charges introduced by oxidation). Note that there was a term called the point of zero charge (PZC) characterizing the EDL. The PZC is the pH value at which a solid material submerged in electrolyte exhibits zero electrical charge on the particle surface. The pH titration approach was used to probe the PZC values for both colloidal solutions with pristine- and salted-SDWNTs.

The zeta ($\zeta$)-potential values, which is the electric potential in the interfacial EDL at the location of the slipping plane relative to a point in the bulk fluid away from the interface, were calculated from particle velocities by using the Helmholtz-Smoluchowski approximation:

$$\mu = \frac{\zeta \epsilon_m V}{4\pi \eta D}$$

where $\mu$ is the electrophoretic mobility, $\eta$ is the viscosity of the solution, $\epsilon_m$ is the dielectric constant of the medium, and D is the electrode separation.

Figure 21B:
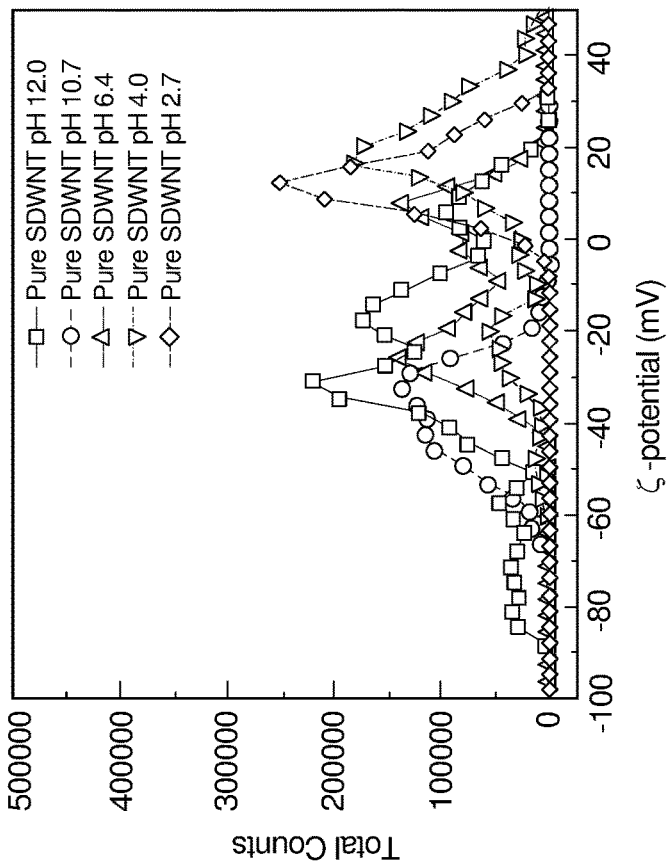
FIGS. 21a-21e illustrate (a) ζ-potential plots of neat-SDWNT aqueous suspensions; (b) ζ-potential plots of salted-SDWNT aqueous suspensions; (c) mild oxidation caused by NaBrO and physical absorption of various ions on CNT surfaces. Where the electrical double-layer structure depicts the surface charge configuration on a salted-SDWNT particle in water; (d) ζ-potential dependence on pH values; and (e) hydrodynamic particle sizes of both salted-SDWNT and neat-SDWNT aqueous suspensions against pH values, where shaded region marked the particle sizes <1000 nm, according to one or more embodiments of the present disclosure.
Figure 21A:
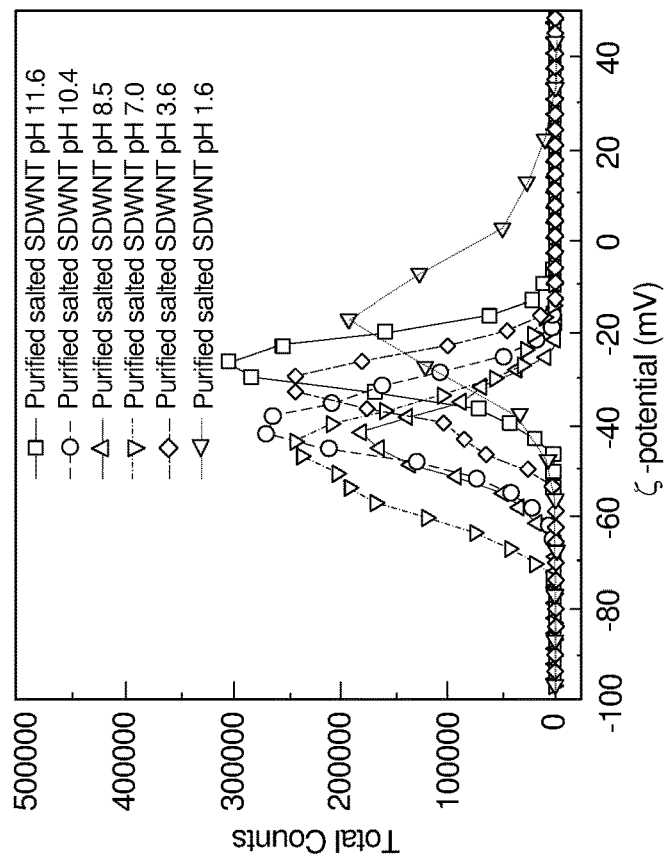
Figure 21C:
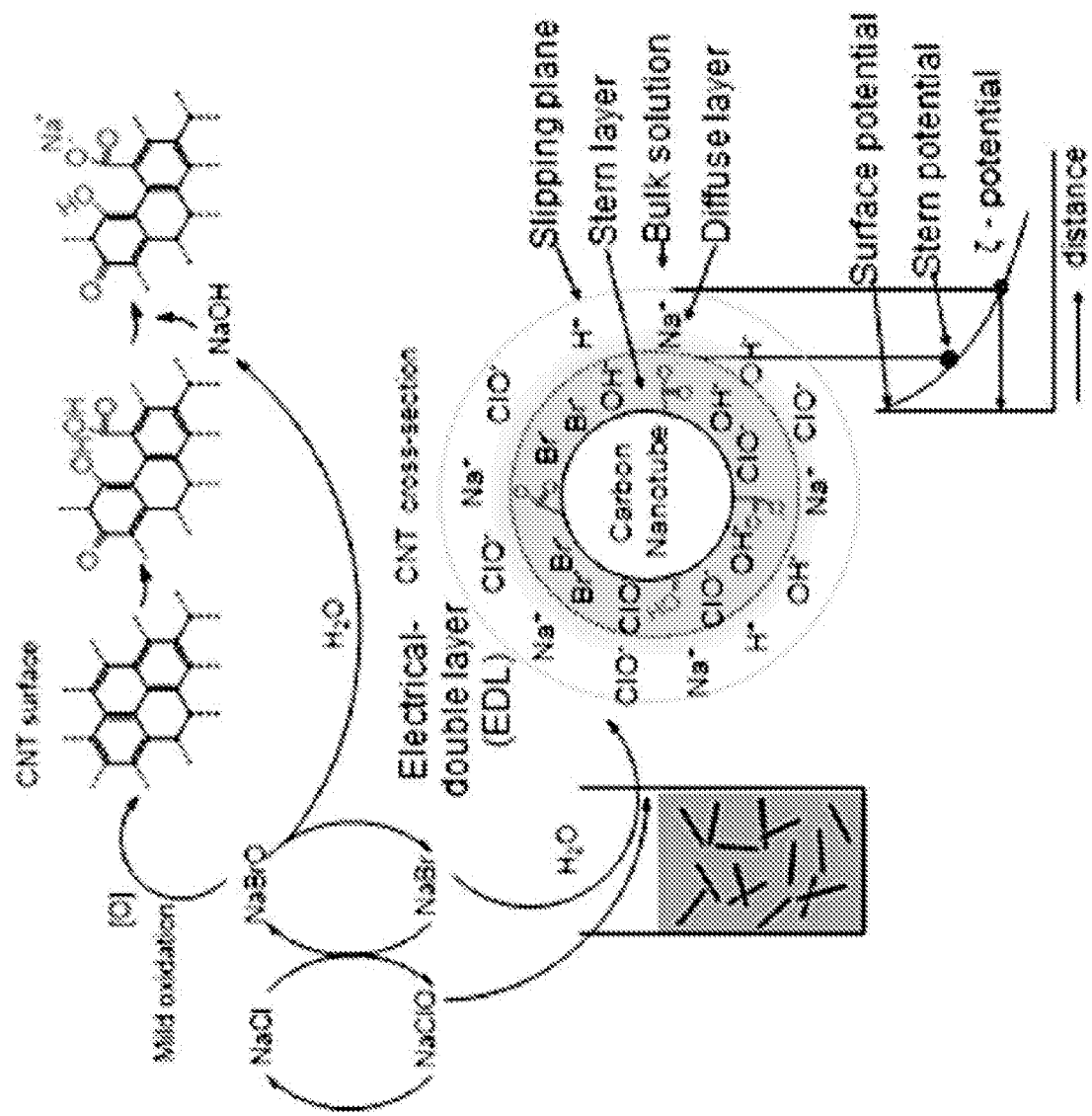
Figure 21E:
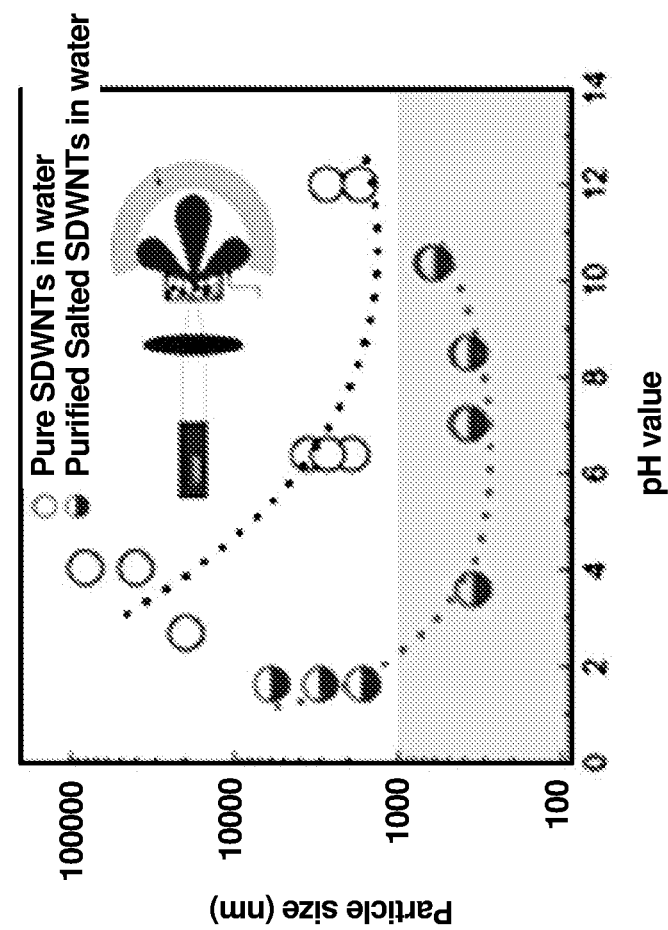
Figure 21D:
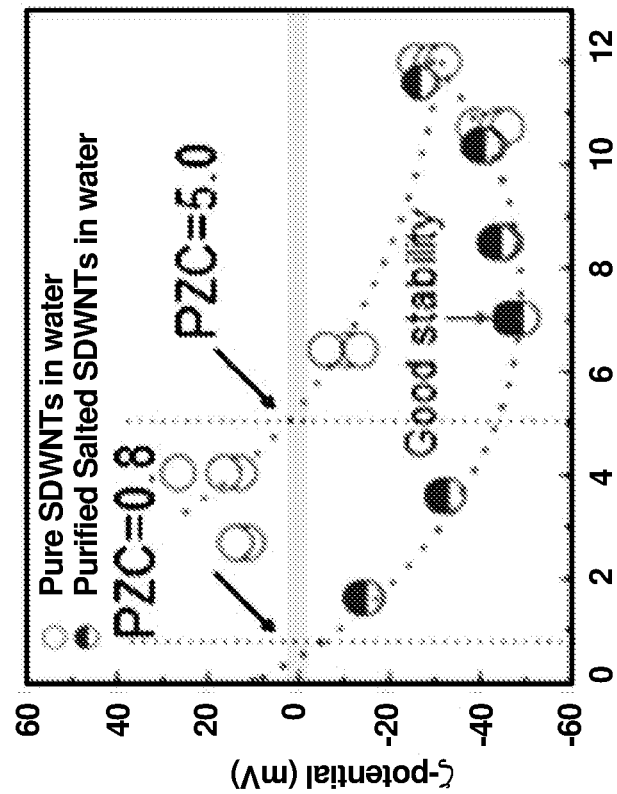

For $\zeta$-potentials, FIG. 21d shows that a negative charge was observed for neat SDWNT aqueous solution at neutral pH~7, which behaved similarly to previous experimental reports. The presence of a negative charge at neutral or basic pH for hydrophobe/water as universal at interfaces of oil/water, air/water, ice/water, etc. A variety of other experiments on, e.g., air bubbles, oil droplets in water, and water droplets in air or oil have reported a negative surface charge. They also used pH-stat experiments in the absence of surfactant to demonstrate quantitatively that hydroxide ions charged and stabilized oil-in-water emulsion droplets. Most importantly, they concluded that hydroxide was the single largest contribution to the net negative charge on the surface at near-neutral pH under a wide range of ordinary experimental conditions. Nevertheless, some scholars hold a contradictory point of view particularly for NaOH-titrated oil/water emulsion; e.g., they justified that negatively charged hydrophobic/water interface was caused by impurity due to presence of byproduct from reaction of fatty acid in oil and hydroxide. However, for the colloidal solutions containing pure electrolyte and SDWNTs described herein, it is believed that the enrichment of negative charges at the SDWNTs/water interface played a critical role to generate the quick "miscibility" of the pristine SDWNT powder into salted solution (step 1) and the good dispersion of pretreated SDWNTs covered with salts in fresh water (step 3), as depicted in FIG. 17b. In conclusion, ion absorption was believed to be one of the reasons causing the change in the physical properties (surface tension, binding free energy) at the interfaces.

In order to understand if each salt used separately could lead to a good dispersion, the quality of the dispersion when using two monosalt solutions was investigated. The first solution corresponded to 5% aqueous NaClO (0.67 M). The second one contained 2.073 g of NaBr dissolved in 30 g of deionized water (0.67 M). The analysis done with the Zetasizer gave the results reported in Table 1. It was clear that while the original salt solution obtained mixing NaClO and NaBr had proved to be an excellent dispersant, this was not true for the other two solutions. In fact, the $\zeta$-potential when using either NaBr or NaClO was almost zero. The low value of $\zeta$-potential as consistent with the aggregation of SDWNTs that was detected by the increase in average size (which is very high at 98 343 and 22 497 nm for NaBr and NaClO, respectively). Some studies reported that NaClO was an oxidizing agent with a oxidation capability higher than $H_2O_2$. However, it was clear from the results that the oxidation induced by NaClO alone was not enough, as the value of $\zeta$-potential is only slightly negative, and that its combination with NaBr played a special role. The synergy between NaClO and NaBr has not been reported. This combination was inspired by the well-known TEMPO oxidation process (reagent: TEMPO oxidizer, NaClO, NaBr) for treating cellulose in paper industry. Formation of BrO— from NaClO and NaBr is unstable, which is well-known in the TEMPO oxidation mechanism for biopolymers (depicted in the drawing). Therefore, it is unlikely there would be BrO-surrounding the CNT. The mechanism for conversion of NaClO and NaBr into NaBrO and the ionic dissociation of them into cations and anions and physical absorption process onto CNT are shown in FIG. 21c.

TABLE 1

Average Size and $\zeta$-Potential of Particles in Three Different Salt Solutions

| solution | size (nm) | st dev (nm) | $\zeta$-potential (mV) | st dev (mV) |
| --- | --- | --- | --- | --- |
| NaBr | 98343 | 86174 | 0.76 | 0.17 |
| NaClO | 22497 | 7779 | −1.439 | 0.94 |
| NaClO + NaBr | 588 | 38 | −35.27 | 0.96 |

Back to the colloidal phenomenon, in FIGS. 21b,d, it was noticed that the curve of salted-SDWNTs had a negative $\zeta$-potential value of −50.5 mV, which likely implied presence of an intensive surrounding of a tightly bound layer of anions with "-" charges. Overall, the experiment to identify $\zeta$-potential at neutral pH delivered two messages: First, neat-SDWNT particles have a negatively charged hydrophobic/water interface, which supported a variety of other experiments on, e.g., air bubbles, oil droplets in water, and water droplets in air or oil reported to have a negative surface charge. Second, salted-SDWNT particles have a very intense negatively charged interface resulting with a good dispersion.

Where do these charges originate from? In the first step, dissolving NaClO/NaBr induced ionization of salts and introduced negative anions into the dispersing medium (electrolyte), e.g., OH—, ClO—, and Br—; these ions were believed to be present in the solution when the system was in equilibrium:

$$NaClO + H_2O \leftrightarrow NaOH + HClO \leftrightarrow Na^+ + OH^- + H^+ + ClO^- \qquad (1)$$

The addition of sodium bromide into sodium hypochlorite generated no new ionic species. Based on $\zeta$-potential experiments, there was likely a strong ionic enrichment that facilitated the formation of the electrical double layer (EDL) (FIG. 21c). Up to now, it had not been possible to determine what ion species are in the double layer. From the literature, hydroxide ions certainly played a vital role in the EDL; halogen group elements (Cl—, Br—) were proven also capable of entering the EDL. In addition, ClO— behaved as a weak acid. It was claimed that a stable colloidal solution of CNTs dispersed in water was obtained by sonicating CNTs in hypophosphorous acid ($H_3PO_2$) for a short time. It was also claimed that the dissociation and formation of anions $H_2PO_2{-}$ from $H_3PO_2$ facilitated a good colloidal stability of CNTs. On top of the anion, to form an electrical double layer, there was a thin layer of cations, i.e., hydronium $H^+$ and sodium $Na^+$, which has to neutralize the negative surface charge. More specifically, the enrichment of anions on the surface of SDWNTs eventually overcame the van der Waals forces: instead of naturally aligning themselves together into ropes, the individual nanotubes remained distanced owing to the anionic enrichment and intercalation effect of ions between CNTs.

This negative-charge-enrichment hypothesis was further supported by the changes of $|\zeta|$ values by pH titration of the salted-SDWNT solution (FIGS. 21$a,b,d$). To adjust the pH, 0.1 M hydrochloric acid (HCl) or 0.1 M sodium hydroxide (NaOH) solutions were added to the CNT solutions for titration measurements. Here the system was characterized by using IEP=0 (FIG. 21$d$, green zone). For the neat SDWNTs, PZC=5.0; at this point, the SDWNTs were surrounded by zero charges. Above IEP, the $\zeta$-potential decreases with an increasing pH, implying that hydroxide ions dissociated from NaOH electrolyte indeed accumulated on the SDWNT surface. Below IEP, acidification resulted in an accumulation of positive charge on the neat SDWNTs.

To the contrary, in salted-SDWNTs the $\zeta$-potential became more negative with increasing pH until a maximum was reached and then started to increase again. First, acidification caused a neutralization of the salts, as evidenced by an increased $\zeta$-potential from $-50.5$ mV (pH=7) to $-20.1$ mV (pH=1.8). Below IEP (PZC=0.8), extremely acidic pH environment resulted in "zero" charge, suggesting the particles were intensive negatively "-" charged. Addition of a base into the salted-SDWNTs still maintained a $\zeta$-potential at $\sim -40.0$ mV. The upwarding potential at extremely high pH condition looked like that of the surfactant-assisted CNT dispersion, which may be associated with ion amount-induced coiling of the CNTs.

Hydrodynamic particle sizes were analyzed for the salted-SDWNT and the neat-SDWNT aqueous colloidal solutions, using dynamic light-scattering measurement (FIG. 21$e$). Neat-SDWNT particles formed aggregates easily and precipitated within a short time, forming a clear boundary between "coarse particle" and "dispersant." For salted-SDWNTs, rapid coagulation occurred as pH became extremely acidic at 1.6. The average aggregate radius came close to a high of 10 min. This was due to the presence of a low surface charge in acid-adjusted salted SDWNTs, which was not sufficient to avoid strong aggregation and precipitation of SDWNTs during measurement. The addition of a strong base to both the neat-SDWNTs and the salted-SDWNTs maintained similar particle sizes to that of neutral pH, seemingly from the no phase separation, which strongly supported the view that anion enrichment at the CNT/water interfaces facilitated colloidal stability of carbon nanotubes.

To summarize, a simple approach to solubilize high concentration SDWNTs in water was demonstrated. Suspensions with a concentration up to 2 mg mL$^{-1}$ were stable without the use of any surfactants. A negatively charged hydrophobic/water interface combined with NaClO-induced oxidation was proven experimentally to induce a good colloidal stability of CNTs. This dispersion technique for achieving SDWNTs at high concentration can now lead to dispersal of other similar types of carbon nanomaterials in water, which have important implications for researchers working in other fields.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of preparing a colloidal solution, comprising:
preparing a salted aqueous solvent, wherein the salted aqueous solvent includes sodium hypochlorite and sodium bromide; and
dispersing a graphitic material in the salted aqueous solvent, wherein the graphitic material includes one or more of few-layer graphene nanoplatelets, few-layer graphene, graphene nanosheets, graphene powder, graphene nanoribbons, carbon nanotubes, carbon spheres, and fullerenes.

2. The method of claim 1, wherein a surface energy of the salted aqueous solvent is similar to a surface energy of the graphitic material.

3. The method of claim 1, wherein a molar ratio of sodium hypochlorite to sodium bromide is about 1:1.

4. The method of claim 1, wherein the graphitic material is dispersed via one or more of sonication and stirring.

5. A method of treating a graphitic material, comprising:
agitating a graphitic material in a salted aqueous solvent containing sodium hypochlorite and sodium bromide, wherein the graphitic material includes one or more of few-layer graphene nanoplatelets, few-layer graphene, graphene nanosheets, graphene powder, graphene nanoribbons, carbon nanotubes, carbon spheres, and fullerenes; and
removing residual chemical species to obtain a treated graphitic material.

6. The method of claim 5, wherein a surface energy of the salted aqueous solvent is similar to a surface energy of the graphitic material.

7. The method of claim 5, wherein residual chemical species include one or more of ionic chemicals, supernatant, solvent, and residual catalyst introduced during processing of the graphitic material.

8. The method of claim 5, wherein the treated graphitic material is a water-soluble graphitic material.

9. The method of claim 5, wherein the treated graphitic material is re-dispersed in a liquid medium to form a colloidal solution.

10. The method of claim 9, wherein the liquid medium is water.

11. A colloidal solution, comprising:
a liquid medium; and
a treated graphitic material dispersed in the liquid medium sufficient to form a colloidal solution, wherein the treated graphitic material is a graphitic material treated in a salted aqueous solution,
wherein the graphitic material includes one or more of few-layer graphene nanoplatelets, few-layer graphene, graphene nanosheets, graphene powder, graphene nanoribbons, carbon nanotubes, carbon spheres, and fullerenes,
wherein the salted aqueous solution comprises sodium hypochlorite and sodium bromide.

12. The colloidal solution of claim 11, wherein the liquid medium includes one or more of water, methanol, N-Methyl-2-pyrrolidone, tetrahydrofuran, and polymer monomer.

13. The colloidal solution of claim 11, wherein the electronic properties of the graphitic material remain preserved in the colloidal solution.

14. The colloidal solution of claim 11, wherein a sp2 hybridization of the graphitic material remains preserved in the colloidal solution.

15. The colloidal solution of claim 11, wherein the colloidal solution is formed without any dispersants or surfactants.

* * * * *